US008391466B1

(12) United States Patent
Noble, Jr.

(10) Patent No.: US 8,391,466 B1
(45) Date of Patent: Mar. 5, 2013

(54) GENERATING COMMUNICATION FORECASTS AND SCHEDULES BASED ON MULTIPLE OUTBOUND CAMPAIGNS

(75) Inventor: James K. Noble, Jr., Marietta, GA (US)

(73) Assignee: Noble Systems Corporation, Atlanta, GA (US)

( * ) Notice: Subject to any disclaimer, the term of this patent is extended or adjusted under 35 U.S.C. 154(b) by 0 days.

(21) Appl. No.: 13/556,961

(22) Filed: Jul. 24, 2012

(51) Int. Cl.
 *H04M 3/00* (2006.01)
(52) U.S. Cl. ......... 379/266.07; 379/266.08; 379/266.09; 379/265.01; 379/265.02; 379/265.09
(58) Field of Classification Search ............. 379/265.01–266.01; 705/7–9, 705/14.42, 14.54
See application file for complete search history.

(56) References Cited

U.S. PATENT DOCUMENTS

| | | | |
|---|---|---|---|
| 5,592,543 A | 1/1997 | Smith et al. | |
| 5,594,790 A * | 1/1997 | Curreri et al. | 379/266.07 |
| 5,594,791 A | 1/1997 | Szlam et al. | |
| 5,784,452 A | 7/1998 | Carney | |
| 5,911,134 A | 6/1999 | Castonguay et al. | |
| 6,587,831 B1 | 7/2003 | Obrien | |
| 6,822,945 B2 | 11/2004 | Petrovykh | |
| 6,850,613 B2 | 2/2005 | McPartlan et al. | |
| 6,970,829 B1 * | 11/2005 | Leamon | 705/7.14 |
| 7,650,293 B2 | 1/2010 | Kiran et al. | |
| 7,761,323 B2 | 7/2010 | Rafter et al. | |
| 7,873,157 B1 * | 1/2011 | Sim | 379/266.08 |
| 7,894,595 B1 * | 2/2011 | Wu et al. | 379/265.11 |
| 7,984,441 B2 | 7/2011 | Briccarello et al. | |
| 8,078,486 B1 | 12/2011 | McLean et al. | |
| 8,108,237 B2 | 1/2012 | Bourne et al. | |
| 8,126,134 B1 | 2/2012 | Fama | |
| 2003/0009520 A1 | 1/2003 | Nourbakhsh et al. | |
| 2003/0037113 A1 | 2/2003 | Petrovykh | |
| 2003/0095652 A1 | 5/2003 | Mengshoel et al. | |
| 2004/0111310 A1 | 6/2004 | Szlam et al. | |
| 2007/0198322 A1 | 8/2007 | Bourne et al. | |
| 2008/0091501 A1 | 4/2008 | Tewari et al. | |
| 2008/0181389 A1 * | 7/2008 | Bourne et al. | 379/265.06 |
| 2009/0012760 A1 | 1/2009 | Schunemann | |
| 2009/0161849 A1 * | 6/2009 | Minnich et al. | 379/112.01 |
| 2010/0002863 A1 * | 1/2010 | Loftus et al. | 379/265.02 |
| 2010/0172485 A1 * | 7/2010 | Bourke et al. | 379/265.05 |
| 2010/0257049 A1 * | 10/2010 | Flombaum et al. | 705/14.42 |
| 2011/0150208 A1 | 6/2011 | Stearns | |
| 2011/0194684 A1 * | 8/2011 | Ristock et al. | 379/265.02 |

OTHER PUBLICATIONS

Noble Systems Corporation, ShiftTrack Plus User Manual 5.5.0, Jun. 2010, 1281 pages, Atlanta, GA.
Noble Systems Corporation, NobleWFM 2010.0.0 User Guide, Mar. 28, 2011, 324 pages, Atlanta, GA.

* cited by examiner

*Primary Examiner* — Joseph J Nguyen

(57) ABSTRACT

Various embodiments of the invention provide methods, systems, and computer program products for generating an outbound forecast. In particular embodiments, campaign parameters are defined for at least two outbound call campaigns that include for each campaign a time period over which the campaign is to be carried out, a target value identifying a number of an outbound communication result to occur over the time period, and sources for handling outbound communications. Further, a historical dataset is selected that includes historical data on the corresponding outbound communication result for each campaign based on past outbound communications. In various embodiments, an outbound forecast is generated based on the historical dataset and campaign parameters for the outbound call campaigns. The forecast provides a number of the outbound communication result forecasted to be achieved over the time period for each campaign in an attempt to meet the target value for the corresponding campaign.

21 Claims, 9 Drawing Sheets

GENERATING COMMUNICATION FORECASTS AND SCHEDULES BASED ON MULTIPLE OUTBOUND CAMPAIGNS

BACKGROUND

Scheduling agents at contact centers is a complex process that typically involves a large number of variables to consider in generating schedules such as, for example, volume of communications to be handled (e.g., number of inbound communications typically received over a time period and/or number of outbound communications to be made over the time period), available staff, skills of various staff members (e.g., agents), reasons for communications (e.g., customer service, order taking, and/or sales), and number of communication sources (e.g., inbound call queues, outbound call queues, emails, and/or web chats). Further, in generating such schedules, forecasting techniques are typically employed to better predict scheduling variables based on historical data for such variables.

Although a good amount of effort has been put into creating products and processes for generating schedules for contact centers, deficiencies still exist with respect to products and processes for generating schedules for contact centers handling outbound communications. That is, many contact centers conduct what are known as outbound campaigns that generally relate to agents contacting a number of different parties for some specific purpose such as, for example, contacting a number of patrons of a particular charity to solicit donations before the end of the tax year. However, many of the products and processes available for scheduling such outbound campaigns fail to provide schedules for conducting outbound campaigns that are in line with many contact centers' goals of reducing operating costs, optimizing resources, maximizing customer service, and improving agent morale and performance. Furthermore, such products and processes are further deficient because, in many instances, contact centers conduct multiple outbound campaigns that overlap, run concurrently, contiguously, or approximate to one another and these products and processes cannot handle such situations.

Thus, a need in the art exists for improved processes for generating forecasts and schedules to conduct outbound campaigns. In addition, a need in the art exists for processes for generating forecasts and schedules in instances involving multiple outbound campaigns. Further, a need in the art exists for processes revising forecasts and/or schedules based on performance data collected for a portion of outbound campaigns being conducted. It is with respect to these considerations and others that the disclosure herein is presented.

BRIEF SUMMARY

In general, embodiments of the present invention provide computer program products, methods, systems, apparatus, and computing entities for generating an outbound forecast. In various embodiments, campaign parameters are defined for at least two outbound call campaigns. These campaign parameters include: (1) a time period over which the outbound call campaign is to be carried out, (2) a target value identifying a number of an outbound communication result to occur over the time period, and (3) one or more sources for handling outbound communications. In particular embodiments, at least a portion of the time period for each of the outbound campaigns overlap one another. In addition, a historical dataset is selected. In particular embodiments, this historical dataset comprises historical data on the corresponding outbound communication result for each outbound call campaign based on past outbound communications handled by the one or more sources over a historical time period. At this point, an outbound forecast is generated based on the historical dataset and the campaign parameters for each of the outbound call campaigns. In various embodiments, the forecast provides a number of the outbound communication result forecasted to be achieved over the time period for each outbound call campaign in an attempt to meet the target value for the corresponding outbound call campaign.

In particular embodiments, a priority order may be set for the attempts to meet the target values for the outbound call campaigns over the time period and the generation of the outbound forecast takes into consideration this priority order. In addition, in particular embodiments, the process for generating the outbound forecast further involves editing the campaign parameters for at least one of the outbound call campaigns by revising at least one of the campaign parameters and generating a revised outbound forecast based on the historical dataset and the edited campaign parameters. The revised outbound forecast provides a revised number of the outbound communication result forecasted to be achieved over the time period for each outbound call campaign in the attempt to meet the target value for the corresponding outbound call campaign. In particular embodiments, an optimal outbound forecast may be identified based on the number of the outbound communication result forecasted to be achieved for each outbound call campaign in the outbound forecast and the revised number of the outbound communication result forecasted to be achieved for each outbound call campaign in the revised outbound forecast.

Further, in particular embodiments, the outbound communication result for each of the outbound call campaigns comprises one of: (1) a total number of communications that need to be made during the time period or a portion of the time period for the corresponding outbound call campaign; (2) a number of communications that need to be answered during the time period or the portion of the time period for the corresponding outbound call campaign; (3) a number of communications answered that need to be answered by a right party; and (4) a number of communications answered by the right party that need to result in a targeted activity being completed. In addition, in particular embodiments, forecast parameters may be defined that include an indicator of an amount of the historical dataset to use for the outbound forecast. In these particular embodiments, the outbound forecast is also based on these forecast parameters.

Furthermore, in particular embodiments, the process for generating an outbound forecast may further involve generating a roster template. In these particular embodiments, the roster template comprises shifts needed to meet the number of the outbound communication result forecasted to be achieved for each outbound call campaign in the outbound forecast. Thus, a staff of agents may be applied to the shifts of the roster template to produce a schedule that defines which agents of the staff are to work which of the shifts during at least a portion of the time period over which each of the outbound call campaigns is to be carried out. In addition, the roster template may further comprise rules defining types of shifts required during each of the outbound call campaigns, a number of each shift type required during each of the outbound call campaigns, types of agents required during each shift type, a number of each agent type required during each shift type, and skills required by each agent type.

Finally, in particular embodiments, the process may further involve generating an outbound forecast that is also based on an inbound forecast. In these particular embodiments, a number of agents available for each of the outbound call campaigns during the corresponding time period is determined based on a total number of agents available for handling outbound communications and inbound communications minus a number of agents allocated to the inbound forecast.

The subject matter disclosed herein may be implemented as a computer-controlled apparatus, a method, a computing system, or as an article of manufacture such as a computer-readable storage medium. These and various other features will be apparent from the following Detailed Description and the associated drawings.

This Summary is provided to exemplify concepts at a high level form that are further described below in the Detailed Description. This Summary is not intended to identify key or essential features of the claimed subject matter, nor is it intended that this Summary be used to limit the scope of the claimed subject matter. Furthermore, the claimed subject matter is not limited to implementations that address any or all disadvantages noted in any part of this disclosure.

BRIEF DESCRIPTION OF THE SEVERAL VIEWS OF THE DRAWINGS

Reference will now be made to the accompanying drawings, which are not necessarily drawn to scale, and wherein.

DETAILED DESCRIPTION

Figure 1:
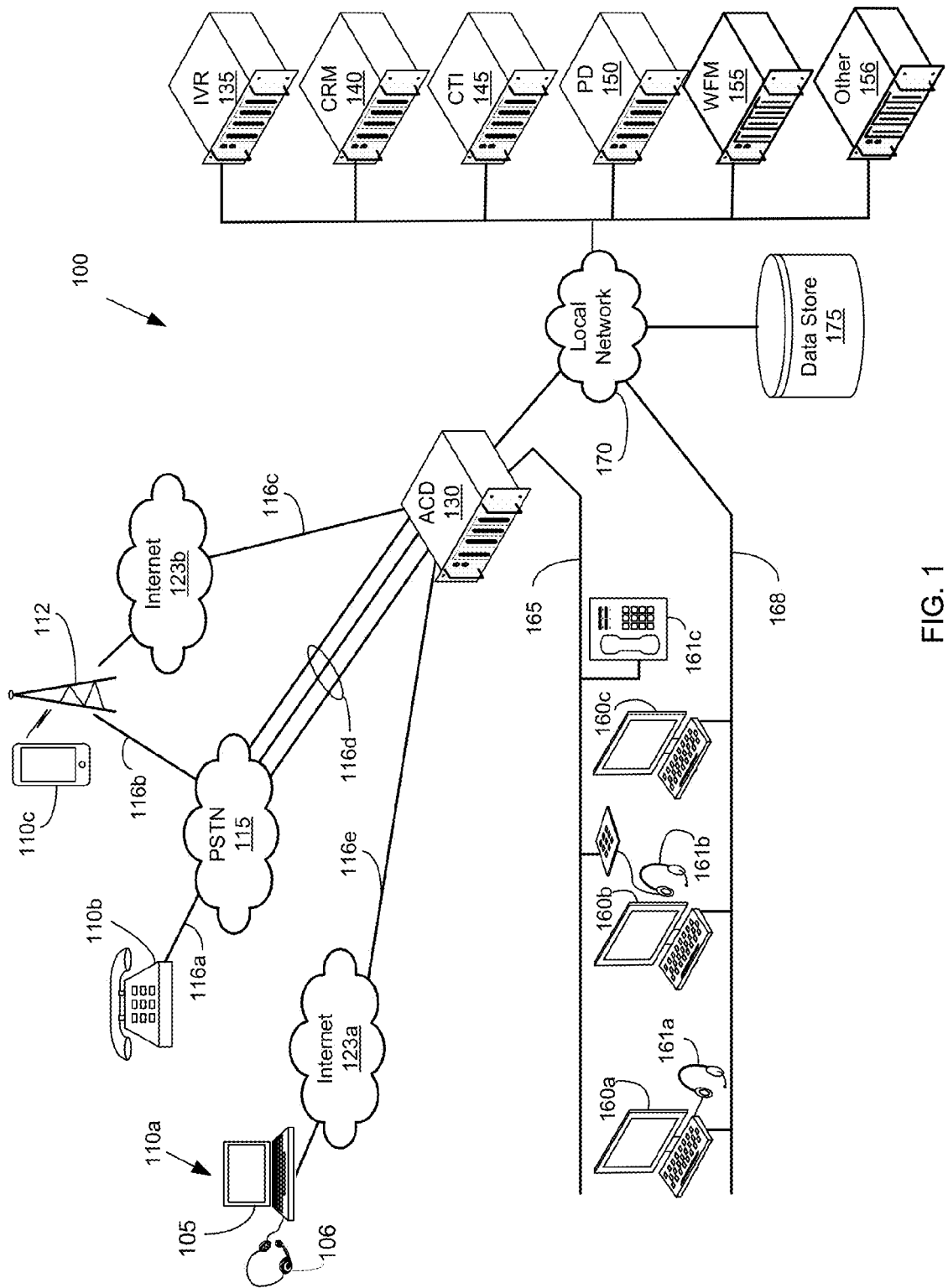
FIG. 1 shows one embodiment of a call center architecture illustrating the various technologies disclosed herein.

Various embodiments for practicing the technologies disclosed herein are described more fully hereinafter with reference to the accompanying drawings, in which some, but not all embodiments of the technologies disclosed are shown. Indeed, the embodiments disclosed herein are provided so that this disclosure will satisfy applicable legal requirements and should not be construed as limiting or precluding other embodiments applying the teachings and concepts disclosed herein. Like numbers in the drawings refer to like elements throughout.

Exemplary Call Center Architecture

FIG. 1 shows one embodiment of a call center architecture 100 illustrating the various technologies disclosed herein.

The call center shown in FIG. 1 may process voice calls that are inbound-only, outbound-only, or a combination of both (sometimes referred to as a "blended" call center). Although many aspects of call center operation are disclosed in the context of voice calls, in various embodiments, the call center may process other forms of communication such as, for example, facsimiles, emails, text messages, video calls, and chat messages. That is, the call center may be considered a contact center. However, for the purposes of this disclosure, the term "call center" is used throughout, although it is understood that the two are synonymous.

Since the call center may handle calls originating from a calling party, or initiated to a called party, the term "party," without any further qualification, refers to a person associated with a call processed by the call center, where the call is either received from or placed to the party. The term "caller," if used, will generally refer to a party communicating with the call center, but in many cases this usage is exemplary. Thus, use of the term "caller" is not intended to limit the concepts to only inbound calls or voice calls, unless the context dictates such.

Depending on the embodiment, inbound voice calls may originate from calling parties using a variety of different phone types. For instance, a calling party may originate a call from a conventional analog telephone 110b connected to a public switched telephone network ("PSTN") 115 using an analog plain old telephone service ("POTS") line 116a. The calls may be routed by the PSTN 115 and may comprise various types of facilities 116d, including, but not limited to: T1 trunks, SONET based fiber optic networks, ATM networks, etc. Various types of routers, switches, bridges, gateways, and other types of equipment may be involved in the processing of the calls.

Inbound voice calls may also originate from a smart phone device 110c, such as a smart phone, tablet, or other smart device, which wirelessly communicates with a mobile service provider ("MSP") 112. The voice calls may be routed to the PSTN 115 using an integrated services digital network ("ISDN") interface 116b or other types of interfaces that are well known to those skilled in the art. In particular embodiments, the MSP 112 may also route calls as packetized voice, referred to herein as voice-over-IP ("VoIP") to an Internet provider 123b using Internet-based protocols. For convenience, unless indicated otherwise, the term "trunk" refers to any type of facility 116c, 116d, or 116e providing voice calls to, or from, the call center, regardless of the type of protocol or technology used. Specifically, a "trunk" is not limited to time-division multiplexing ("TDM") technology.

Inbound voice calls may also originate from a calling party employing a so-called "IP phone," "VoIP phone," or "soft phone" 110a. In one embodiment, this device may comprise a computing device 105, such as a laptop, computing tablet, or other electronic device, which interfaces with a headphone/microphone combination, also referred to as a "headset" 106. An IP phone may use a digital voice control protocol and may process packetized voice data according to various Internet based voice protocols, such as session initiated protocol ("SIP"). The call may be conveyed by other types of Internet providers 123a, such as a cable company providing Internet access services over a coaxial cable facility 116e. Those skilled in the art will recognize that a variety of protocols and facilities may be used to convey voice calls.

The term "telephone call" as used herein is generally synonymous with a "voice call" unless indicated otherwise. Further, the term "telephone call" may encompass a voice call originating from any type of device, such as a soft phone 110a, conventional telephone, 110b, a smart phone 110c, or other device known in the art. The term "call" as used herein may mean an active instance of two-way communication, an attempt to establish two-way communication, or a portion of the two-way communication. For example, a user at a conventional telephone 110b can dial a telephone call in an attempt to establish two-way communication, and a call can be said to exist even prior to establishment of a two-way connection. In another example, a call may be put on hold, and a portion of the call may be referred to as a "call leg" existing between the caller and certain equipment. A call may comprise a number of concatenated call legs, as known to those skilled in the art. In certain contexts, which will be made explicit, the call may encompass communications other than voice, for example, text, email, video chat, facsimile, etc.

In various embodiments, inbound calls from callers to the call center may be received at an automatic call distributor ("ACD") 130. In particular embodiments, the ACD 130 may be a specialized switch for receiving and routing inbound calls under various conditions. Further, the ACD 130 may be embodied as a dedicated form of equipment readily available from various manufacturers, or the ACD 130 may be a so-called "soft switch" comprising a suitable programming module executed by a processing device to perform the necessary functions. The ACD 130 may route an incoming call over call center facilities 165 to an available agent. Depending on the embodiment, the facilities 165 may be any suitable technology for conveying the call, including but not limited to a local area network ("LAN"), wide area network ("WAN"), ISDN, or conventional TDM circuits. In addition, the facilities 165 may be the same or different from the facilities used to transport the call to the ACD 130.

In various embodiments, calls may be routed over facilities 165 to an agent for servicing. That is, for example, the party may speak with an agent to receive customer service. The physical area at which the agent sits is often referred to as an agent "position" and these positions are often grouped into clusters managed by a supervisor, who may monitor calls and the agents' productivity. An agent typically uses a computing device 160a-160b, such as a computer, and a voice device 161a-161c. The combination of computing device 160a-160c and voice device 161a-161c may be referred to as a "workstation." Thus, for these particular embodiments, the workstation collectively has a data capability and a voice capability, although separate devices may be used. In some instances, "workstation" may be used in reference to either the data or voice capability at the agent's position. For example, "routing the call to the agent's workstation" means routing a call to one of the voice devices 161a-161c at the agent's position. Similarly, "routing the call to the agent" means routing a call to the appropriate equipment at an agent's position.

In particular embodiments, the voice device 161a-161c used by an agent may be a soft phone device exemplified by a headset 161a connected to the computer 160a. The soft phone device may be a virtual telephone implemented in part by an application program executing on the computer 160a. Further, the phone may also comprise an Internet Protocol ("IP") based headset 161b or a conventional phone 161c. Use of the term "phone" is intended to encompass all these types of voice devices used by an agent, unless indicated otherwise.

Agents typically log onto their workstations prior to handling calls. This allows the call center to know which agents are available for handling calls. In particular embodiments, the ACD 130 may also maintain data of an agent's skill level that may be used to route a specific call to the agent or group of agents having the same skill level. In particular instances, if a suitable agent is not available to handle a call, the ACD 130 may queue the call for the next available agent. As can be expected, various algorithms may be employed to process calls in an efficient manner.

In various embodiments, two types of signaling information may be provided with an inbound call that may be used by the ACD 130 in processing the call. The first type of signaling information indicates the telephone number dialed by the caller, and is frequently referred to as "DNIS," derived from the Dialed Number Identification Service associated with this capability. For example, in particular instances, a call center may provide various services, such as sales, customer service, technical support, etc., each of which may be associated with a different telephone number (e.g., multiple toll free "800" numbers). In these instances, the ACD 130 may use the DNIS to determine the purpose of the call, and potentially identify a group of agents having the appropriate skill level to handle the call. Thus, in various embodiments, the ACD 130 may prioritize and route calls to an agent based on the required skill level. Skills-based routing may be a rule-based set of instructions that the ACD 130 uses to handle calls. Depending on the embodiment, skills-based routing may be implemented by the ACD 130, or by the ACD 130 interacting with a computer-telephone integrated ("CTI") server 145.

In various embodiments, the CTI server 145 may be incorporated in the call center architecture 100 to control and/or coordinate other components of the architecture 100. Specifically, the CTI server 145 may interact with the ACD 130 to coordinate call processing. Thus, in particular embodiments, the CTI server 145 may control routing of calls from the ACD 130 to the various agent workstations and/or may provide data to other components processing the calls. The CTI server 145 may also provide call reporting functionality based on data collected during calls.

The second type of signaling information that may be provided with an inbound call is the calling telephone number, often referred to as automatic number identification or "ANI." In particular embodiments, the ACD 130 and/or CTI server 145 may use the ANI of an incoming call to retrieve caller information from a data store 175 and provide the data to an agent's workstation computer 160a-160c over facilities 168 along with routing the call to the agent's workstation phone 161a-161c. Further, in particular embodiments, the ANI may also be used to ascertain a party's status (e.g., a "Gold Level" customer warranting premium service) and/or to facilitate the ACD 130 routing the call to a select group of agents. Depending on the embodiment, the data store 175 may include one or more databases storing different information such as, for example, records of caller information. Further, the data store 175 may be integrated with the CTI server 145, the ACD 130, or segregated as a standalone medium or media.

In various embodiments, the ACD 130 may place a call in a queue if there are no suitable agents available, and/or it may route the call to an interactive voice response server ("IVR") 135 to play voice prompts. In particular embodiments, these prompts may be in a menu type structure and the IVR 135 may collect and analyze responses from the party in the form of dual-tone multiple frequency ("DMTF") tones and/or speech. In addition, the IVR 135 may be used to further identify the purpose of the call, such as, for example, prompting the party to enter account information or otherwise obtain information used to service the call. Further, in particular embodiments, the IVR 135 may interact with other components, such as the CTI server 145 or the data store 175, to retrieve or provide information for processing the call. In other configurations, the IVR 135 may be used to only provide announcements.

Depending on the embodiment, the interaction between the ACD 130, IVR 135, CTI server 145, agent computers 160a-160c, as well as other components, may involve using a local area network ("LAN") 170. However, other configurations are possible, such as, but not limited to, using a wide area network, wireless network, router, bridge, direct point-to-point links, etc.

In particular embodiments, when an agent is interacting with a called or calling party, the agent may use his workstation computer 160b to further interact with other enterprise computing systems, such as, for example, a customer relationship management ("CRM") server 140. A CRM server 140 may be used to integrate information from various enterprise business systems to facilitate the agent servicing the call. In addition, the CRM server 140 may provide a variety of applications.

In addition to receiving inbound communications, including, for example, voice calls, emails, text messages, and facsimiles, the call center may also originate communications to a called party, referred to herein as "outbound" communications. In some embodiments, a call center may employ a dialer 150, such as a predictive dialer, to originate outbound calls on behalf of an agent at a rate designed to meet various criteria. Similar to the other components within the call center architecture 100, depending on the embodiment, the dialer 150 may comprise one or more software modules executing on a processing device hardware platform.

In various embodiments, the dialer 150 is typically configured to dial a list of telephone numbers to initiate outbound calls, which can be accomplished by instructing the ACD 130 to originate the calls. Thus, in some embodiments, the ACD 130 may include functionality for originating calls, and if so, this functionality may be referred to as a private automatic branch exchange ("PBX" or "PABX"). In other embodiments (not shown), the dialer 150 may directly interface with voice trunks using facilities 116c, 116d, 116e to the PSTN 115 and/or Internet providers 123a, 123b for originating calls. After the calls are originated, a transfer operation by the ACD 130 (or dialer 150) may connect the call with an agent, or place the call in a queue for an available agent. In the latter case, announcements or music may be provided to the party. In various embodiments, the dialer 150 may make use of one or more algorithms to determine how and when to dial a list of numbers so as to minimize the likelihood of a called party being placed in a queue while maintaining target agent utilization.

Another server that is employed in the call center architecture 100 shown in FIG. 1 is a workforce management ("WFM") server 155. As is discussed in further detail below, in various embodiments, this server 155 maintains information and generates agents' schedules to effectively handle inbound/outbound communications. For instance, in particular embodiments, the WFM server 155 maintains historical call volume information for call campaigns and generates forecasts for expected call volume based on the historical information to predict the number of agents needed to handle the call volume at a defined service level. The WFM server 155 then applies the forecasts and information about available agents to generate work rosters of agents (e.g., schedules). That is, the WFM server 155 schedules agents for work shifts according to the anticipated needs of the call campaigns.

Finally, in various embodiments, the call center architecture 100 may include one or more other processing devices 156 to perform various functions. For example, in one particular embodiment, the call center architecture 100 includes a processing device 156 to serve as a quality assurance system that records communications fielded by agents and/or allows managers to monitor communications to ensure these communications are being handled correctly.

Although the above components are referred to as a "server," each may be also referred to in the art as a "computing device," "unit" or "system." A server may incorporate a local data store and/or interface with an external data store. Use of the word "server" does not require the component to interact in a client-server arrangement with other components, although that may be the case. Further, the above components may be located remotely from (or co-located with) other components. Furthermore, one or more of the components may be implemented on a single processing device to perform the functions described herein. For example, in various embodiments, one or more functionalities of the ACD 130, IVR 135, CRM server 140, CTI server 145, dialer 150, WFM server 155, or other component may be combined into a single hardware platform executing one or more software modules. In addition, the call center architecture 100 may be provided as a hosted solution, where the call processing functionality is provided as a communication service (a so-called "communication-as-a-service" or "CaaS") to a call center operator. Thus, there is no requirement that the servers identified above actually be located or controlled by a call center operator.

In addition, depending on the embodiment, the agent positions may be co-located in a single physical call center or multiple physical call centers. The agents may be remotely located from the other components of the call center, and may also be remotely located from each other, sometimes referred to as a "virtual call center." In particular instances, a virtual call center may describe a scenario in which agents work at home, using their own computers and telephones as workstations. In some configurations, a single physical location of the call center may not be readily identifiable. For instance, this may occur when the call processing functions are provided as a service in a hosted cloud computing environment and the agents positions are in their individual residences.

Those skilled in art will recognize FIG. 1 represents one possible configuration of a call center architecture 100, and that variations are possible with respect to the protocols, facilities, components, technologies, and equipment used. For example, various algorithms and queuing arrangements may be defined to efficiently process and/or place calls.

General Overview of Process

Figure 2:
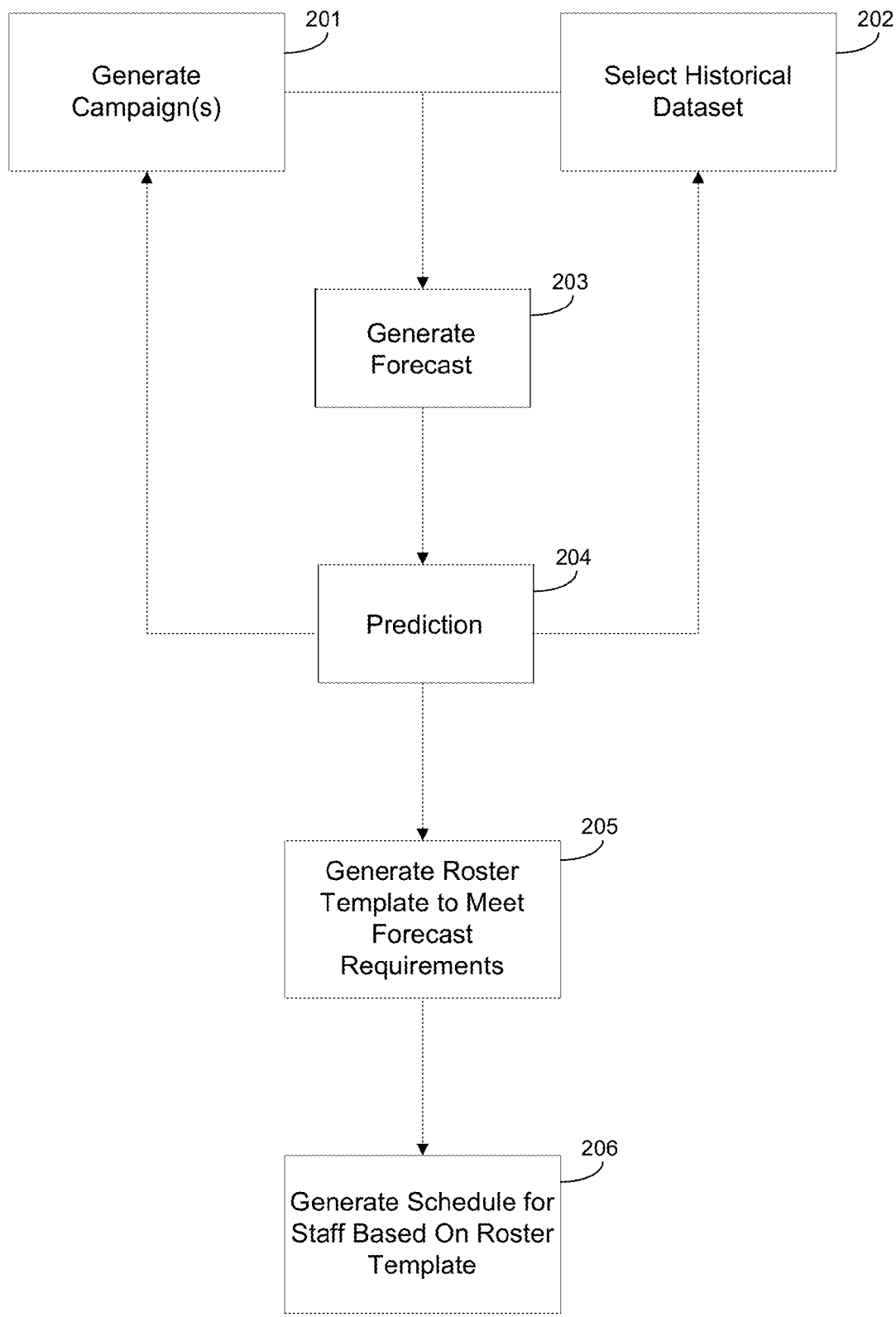
FIG. 2 is a flowchart illustrating a process for generating a schedule for one or more outbound call campaigns according to various embodiments of the present invention.

FIG. 2 provides an overview of a process for generating a schedule for staff involved in one or more outbound campaigns according to various embodiments of the invention. The process may involve execution of various program modules, which may be variously repeated to refine the schedule generated. At a high level, the schedule generation process involves generating/defining or selecting call campaigns, along with historical data, that are then used to generate a forecast. The forecast, in turn, is used to generate a roster template. The roster template is then used to generate the schedule, which identifies the particular staff to fill the shifts. As discussed in further detail below, at various points during this process the user may refine or alter the inputs intermediate for a given module to produce a refined schedule. For purposes of illustration, the user may be a call center administrator.

The process typically begins with generating or selecting one or more outbound campaigns, shown as Step 201. For purposes of this disclosure, an "outbound campaign" is understood to be a series of communications to be placed to various parties in accordance with various parameters, including defined goals (e.g., objectives). For example, a business may conduct an outbound campaign to call and/or email local residents to inform them of a new store location opening in the residents' area. Typically an outbound campaign is defined by parameters such as, for example, the time period over which the campaign will be conducted (e.g., a start date and an end date), a "call" list providing the parties to be contacted and the appropriate information to contact them (e.g., telephone numbers and/or email addresses), and/or the skills needed by those handling the communications (e.g., skills needed by the agents calling the parties on the list).

Further, other parameters associated with the outbound campaign may identify one or more goals or objectives to be achieved by the campaign. For example, a goal may specify a total number of communications that need to be made during the campaign or during a particular time interval of the campaign (dials), a number of the communications that need to be answered (connects), a number of the communications answered that need to reach the right party (right party connects or RPC), or a number of the RPC that need to result in a targeted activity being completed, such as, for example, completing a sale to the party (completes). Thus, generating the one or more campaigns generally involves defining the various parameters for the campaigns.

For example, a call center may be contracted to conduct a first outbound campaign that involves placing a number of outbound phone calls to a list of three thousand past donors for a particular charity. The first outbound campaign is to take place over the first week of June and the goal for this particular campaign is to solicit donations from at least eight hundred of the past donors reached on the phone. In addition, the same call center may be contracted to conduct a second outbound campaign that involves placing a number of outbound phone calls to a list of four thousand homeowners in a particular area to inform them about a new refinancing program being offered by a bank in the area. The second outbound campaign is to take place over the first two weeks of June and the goal for this particular campaign is to reach one thousand of the parties intended to be called. In this instance, portions of the time periods over which the two campaigns are to take place overlap with one another. That is, portions of the two campaigns are to be conducted concurrently. Therefore, the call center may utilize its staff to conduct these portions of the two outbound campaigns at the same time.

For this particular situation, a single forecast may be generated for the two campaigns to predict the likelihood of each campaign meeting its goals over the first two weeks of June. Such an approach may be taken to evaluate what effect conducting the two campaigns will have on each other with respect to the parameters and/or goals defined for each of the outbound call campaigns. Such an approach provides an advantage over conducting a separate forecast for each outbound call campaign because in instances in which a separate forecast is conducted for each outbound call campaign, each forecast would be performed in isolation without consideration of the second call campaign's parameters and/or goals. Thus, the capability to generate a single forecast for multiple outbound campaigns in various embodiments of the invention provides a tremendous advantage over traditional forecasting tools found in the call center industry.

With that said, in various embodiments, a single forecast may not only be generated for multiple campaigns in which at least a portion of the campaigns are conducted concurrently, but also in instances in which the campaigns may be conducted contiguously or in close proximity to one another. Similar to campaigns conducted concurrently, such a forecast allows for the evaluation of what conducting the multiple outbound campaigns may have on one another. For instance, two outbound campaigns may be planned to be conducted contiguously. That is, the first outbound campaign may be planned to be conducted during the first week of June and the second outbound campaign may be planned to be conducted during the second week of June. In this instance, although the two campaigns may not be utilizing the call center's staff at the same time, the call center administrator may still want to see the effect of staffing the first campaign will have on staffing the second campaign to meet the goals of the second campaign. That is, the call center administrator may want to evaluate the availability of staff to work the second campaign as a result of working the first campaign. Those of ordinary skill in the art can envision several reasons a call center may want to generate a single forecast for multiple outbound campaigns in light of this disclosure.

Returning to FIG. 2, in order to generate the forecast, one or more sets of historical data are selected, shown as Step 202. Typically, the selected historical dataset includes historical data for similar types of outbound campaigns as those for which the forecast is being conducted for. Further, in some embodiments, historical data for inbound campaigns may also be used. For example, in the case of the two campaigns described above, the historical dataset may include data on a past outbound campaign conducted to solicit donations for the same charity or similar charity and a past outbound campaign conducted to contact homeowners in the area or area with similar residences.

Once the campaigns have been created and the historical data has been selected, the schedule generation process continues with creating an outbound forecast. In general, the purpose of creating the forecast is to provide an accurate prediction of the resources needed to achieve the defined goal(s) for the one or more outbound campaigns. Thus, the forecast involves analyzing historical data on similar types of communications to predict outcomes of the communications that will be conducted during the one or more outbound campaigns. In Step 203, the forecast is generated for the one or more selected campaigns and a prediction of the likelihood of meeting the goals defined for the campaigns is provided, shown as Step 204. For instance, returning to the example, the forecast may predict for the first campaign that six hundred and eighty-two of the past donors reached during the first week of June are expected to give donations. In addition, the forecast may predict that although the call list for the first campaign comprises three thousand past donors, only two thousand five hundred of the past donors can be called over the first week of June. Further, the forecast may predict for the second campaign that one thousand homeowners are expected to be reached over the first twelve days of June by placing three thousand calls to homeowners on the list.

In particular embodiments, predictions may be based on limitations associated with the call center. For instance, in the example, parameters for the call center may be defined that indicate a maximum number of agents available for any given time interval (e.g., a work day) during the period in which the two campaigns are to be conducted is fifty agents. In addition, a parameter may be defined that indicates that the second campaign should be given priority over the first campaign. That is, the call center is to conduct the two campaigns so that meeting the goal of the second campaign is given priority over meeting the goal for the first campaign. Therefore, based on these parameters and call statistics, such as the average handle time (AHT) determined for a call answered by a caller for each campaign, the forecast may predict that only a certain number of calls (e.g., two thousand five hundred) can be made over the entire week for the first campaign.

Furthermore, in particular embodiments, the forecast may also provide a prediction on what resources are required to meet the goals for the two campaigns. That is, in particular embodiments, a forecast may be created without considering the limitations associated with the call center (e.g., without considering the limitation of the number of agents available for any given time period). For instance, in the example, the forecast may also predict that for the first campaign to actually meet the goal of soliciting eight hundred donations over the first week of June, the first campaign would require twenty-eight agents a day, placing a total of two thousand eight hundred and fifty calls over the week. Such information may help the call center administrator to better understand the effects of added capacities and/or capabilities to the call center.

At this point in various embodiments, if one or more predictions are unsatisfactory, the forecast module may be re-executed using a different/revised set of historical data and/or different/revised campaigns. For instance, returning to the example, the parameters for the first campaign to solicit donations may be revised to indicate that the campaign will now run for the first ten days of the month of June instead of the first week of June. The forecast may then be regenerated based on the revised parameters for the first campaign. The forecast may predict that the first campaign will meet its goal of soliciting eight hundred donations from past donors reached during the first ten days of June. Further, the prediction may indicate that a total of two thousand eight hundred and fifty of the past donors will need to be called to reach the eight hundred donations goal for the first campaign. Thus, a number of forecasts may be generated using revised information until a satisfactory prediction is obtained.

Once a forecast indicating an acceptable set of predictions is produced, a roster template is generated to meet the predictions for the one or more campaigns, shown as Step 205. For purposes of this disclosure, a "roster template" is understood to be a group of shifts based upon a forecast associated with campaigns, where the shifts represent an attempt to meet the campaign goals.

A "shift" is a unit used in planning, allocating, and/or assigning work to staff. In various contexts, a shift may be further characterized by one or more different attributes, such as, for example: a certain type (e.g., outbound call shift, first campaign shift, or a second campaign shift); a time period (e.g., the 8:30 a.m. to 5:30 p.m. shift, evening shift, or graveyard shift); or particular staff members (e.g., John Doe's shift, outbound call agents' shift, or daytime employees' shift). Thus, as demonstrated in these examples, a shift may be associated with an individual (e.g., John Doe's shift) or with a plurality of individuals (e.g., staff members assigned to the evening shift). Thus, the roster template generation process involves identifying a set of shifts to meet the forecast requirements of the one or more campaigns. These shifts may be overlapping, serial relative to one another, or a combination of both. In the last case, a number of shifts may be in parallel to each other during a day and then serial relative to each other over a number of days.

Returning to the example, this step involves defining a set of shifts so that two thousand eight hundred and fifty calls can be made over ten days to past donors and three thousand calls can be made over twelve days to homeowners in order to reach the goals for the two campaigns. The set of shifts may comprise a number of different combinations of shifts to meet the forecast requirements depending on the embodiment. For instance, the set of shifts may include twenty-four shifts from eight o'clock a.m. to three o'clock p.m. for ten of the twelve days and twenty-five shifts from three o'clock p.m. to eleven o'clock p.m. for all twelve days. Some shifts may involve handling calls for the first campaign or the second campaign while other shifts may involve handling calls for both campaigns.

At this point, depending on the embodiment, the roster template may be edited by the call center administrator to modify or define parameters for the shifts and/or to fine-tune the roster template. For example, the shifts may be edited to include a thirty minute break for lunch. In particular instances, the roster template may be regenerated to take into consideration any such edits to the roster template. That is, in the example, the roster template may be regenerated to take into consideration the added thirty minute breaks for lunch. As a result, the roster template may now include twenty-four shifts from eight o'clock a.m. to four o'clock p.m. for ten of the twelve days and twenty-five shifts from two o'clock p.m. to eleven o'clock p.m. for all twelve days in order to meet the forecast requirements. Once the roster template has been generated as desired, the template is saved.

After a roster template has been generated based on the one or more campaigns and forecast, a schedule is generated based on the staff of the call center, shown as Step 206. "Staff" refers to one or more human resources (typically employees of the call center) that can be allocated work. In particular instances, the staff can be characterized as having one or more common attributes. For example, a particular call center may have multiple locations and a staff is considered the employees that work at a particular location, or both locations. Further, a staff may comprise employees of a particular type and/or skill set. For example, one call center may consider its employees to make up a first staff of agents and a second staff of supervisors and managers. In another example, a call center may consider its employees trained to handle outbound sales calls as a first staff and its employees trained to handle outbound donation solicitation calls as a second staff. One of ordinary skill in the art can envision numerous attributes that may be used to define a staff in light of this disclosure.

Thus, returning to the example, the call center staff is used and applied to the roster template to generate a schedule to conduct the two campaigns. The schedule identifies specific members of the staff (e.g., agents) assigned to work in the set of shifts identified for the roster template. That is, the schedule identifies specific agents assigned to work the twenty-four shifts from eight o'clock a.m. to four o'clock p.m. for the first ten days of June and the twenty-five shifts from two o'clock p.m. to eleven o'clock p.m. for twelve days of the first two weeks of June.

Finally, in particular embodiments, the campaign(s), forecast, and resulting roster template and/or schedule may be revised during execution of the campaign(s). Specifically, based on performance data after the campaigns have started, adjustments to the schedule may be generated. For instance, returning to the example, after the first two days have been completed for the two campaigns, performance data may be used to revise the campaigns, forecast, roster template, and/or schedule. In this instance, the performance data may show that for the first two days of the campaigns, five hundred and fifty calls were made for the first campaign resulting in one hundred and fifty-one donations and five hundred calls were made for the second campaign reaching one hundred and seventy homeowners. Therefore, although the performance data for the second campaign appear to be on track to reach the goal for the second campaign over twelve days, the performance data for the first campaign appear to be too low for reaching the goal for the first campaign over ten days. Therefore, in this particular instance, the parameters for the first campaign may be revised to include an extra day for the campaign's duration. The forecast is then regenerated using the revised parameters and the first two days of performance data are included with the historical dataset. As a result, the roster template is revised to include new shifts for the remaining nine days of the campaign and the schedule is re-generated in light of the revised shifts. Thus, as a result of providing performance feedback in the process, the schedule is modified so that the goals for the two campaigns can be met.

Exemplary System Operation

The logical operations described herein may be implemented (1) as a sequence of computer implemented acts or one or more program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof. Greater or fewer operations may be performed than shown in the figures and described herein. These operations may also be performed in a different order than those described herein.

Mange Schedule Module

Figure 3:
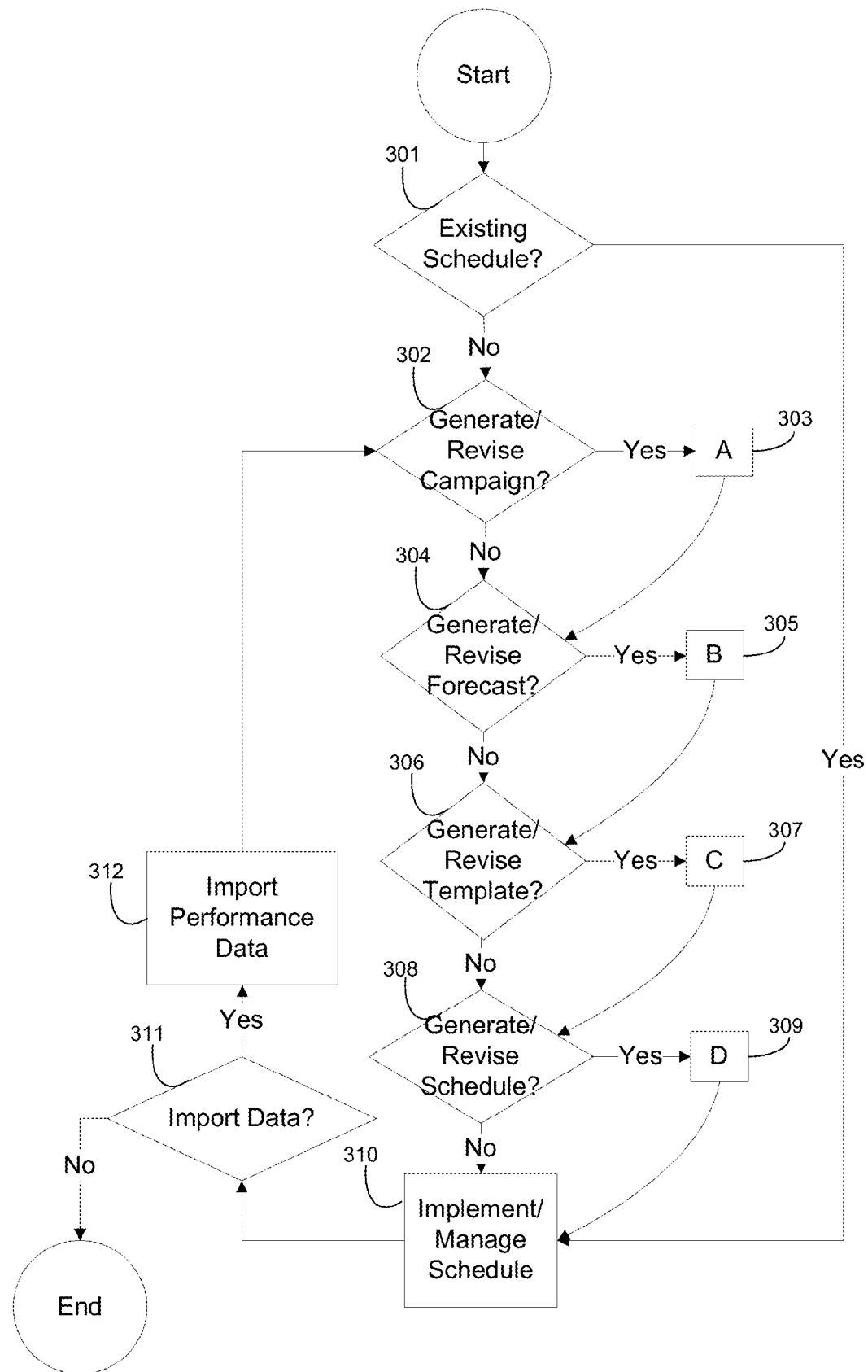
FIG. 3 is a flowchart illustrating a manage schedule module that can be used in accordance with various embodiments of the present invention.

Turning now to FIG. 3, additional details are provided regarding the process flow for managing a schedule to conduct one or more outbound campaigns. In particular, FIG. 3 is a flow diagram showing a manage schedule module for performing such functionality according to one embodiment of the invention. For example, the flow diagram shown in FIG. 3 may correspond to steps carried out by a processor in a computing device, such as the WFM server 155, as it executes the manage schedule module stored in the computing device's volatile and/or nonvolatile memory. In various embodiments, to facilitate the generation and management of one or more schedules directed to outbound campaigns, a call center administrator may be provided with one or more interfaces in communication with the manage schedule module. These interfaces may comprise one or more screens from which the user (e.g., call center administrator) may generate and manage schedules to be used in conjunction with conducting outbound campaigns.

In general, the manage schedule module invokes a number of other modules to provide functionality needed to be performed by the user in relation to generating, revising, implementing, and managing schedules for outbound campaigns. Such functionality includes generating, revising, implementing, and managing outbound campaigns, forecasts, roster templates, and schedules. Further details with respect to the different modules are provided in the discussion below and FIGS. 4-8.

Turning now to FIG. 3, the manage schedule module provides an interface screen ("home screen") with a number of different options for the user to select from. For example, if the user would like to simply revise a schedule previously generated and saved, the user selects the "manage schedule" option and the manage schedule module in Step 301 takes the user to one or more subsequent screens for selecting the schedule and making the appropriate revisions. However, for purposes of providing this disclosure, it is assumed the user is generating a schedule for one or more new outbound campaigns.

Thus, the user initially selects the option to generate one or more new outbound campaigns and the manage schedule module determines this option has been selected in Step 302. As a result, the manage schedule module invokes the campaign module for generating an outbound campaign, shown as Step 303. As is explained in greater detail below, the user generates the new campaign(s) via the campaign module and saves the campaign(s). The generation process for these new campaign(s) involves defining a number of parameters for the new campaign(s).

Depending on the embodiment, the user may be returned to the home screen displaying the different options or may be taken directly to one or more screens for generating a forecast based on the new campaign(s). That is, depending on the embodiment, the manage schedule module may determine the option to generate a forecast has been selected in Step 304 by the user selecting the option on the home screen or by the campaign module setting the option. Accordingly, the manage schedule module invokes the forecast module in Step 305. As explained in further detail below, the forecast module generates a forecast based on the parameters for the new campaign(s) and historical data on outbound communications conducted for one or more past campaign(s). Depending on the embodiment, the forecast provides predictions on the likelihood of meeting the objectives (e.g., goals) of the new campaign(s) and other related information (e.g., requirements) such as, for example, the number of communications to be made over the time period the campaign(s) are to be conducted.

Once the forecast module has generated a satisfactory forecast, the manage schedule module determines whether the option to generate a roster template has been selected, shown as Step 306. Similar to the forecast option, depending on the embodiment, the template option may be selected by the user on the home screen or by the forecast module. Thus, the manage schedule module invokes the roster template module, shown as Step 307. As previous described, the roster template defines a group of shifts needed to meet the forecast requirements. In various embodiments, the user may define further characteristics (e.g., parameters) for the roster template. Once the user is satisfied with the roster template, the roster template is saved.

At this point, the manage schedule module determines whether the option to generate a schedule has been selected, shown as Step 308. Again, the option may be selected by the user from the home screen or by the roster template module depending on the embodiment. Upon determining the option to generate a schedule has been selected, the manage schedule module invokes the schedule module, shown as Step 309. Once the schedule module has been invoked, the user generates a schedule for conducting the campaign(s) by identifying staff to fill the roster template. Similar to the roster template, the user may define further characteristics (e.g., parameters) for the schedule. Once the user is satisfied with the schedule, the schedule is saved.

Once the schedule has been generated and saved, the user may be presented with one or more screens to implement the schedule, shown as Step 310. Depending on the embodiment, implementation of the schedule may involve different processing operations. For instance, in one embodiment, the schedule may simply be posted so that staff may view the schedule to determine when they are to work during the outbound campaign(s). However, in other embodiments, the schedule (and/or information from the schedule) may be uploaded to one or more other business enterprise systems in the call center to facilitate further functionality during the outbound campaign(s). For example, in particular embodiments, supervisors may make use of monitoring systems to ensure agents are adhering to their schedules and working efficiently during the outbound campaign(s). Information taken from the schedule (such as, for instance, which agents are scheduled to work during a particular shift) may facilitate such monitoring.

As the campaign(s) are carried out in the call center, the user (e.g., call center administrator) may wish to manage the schedule based on changing circumstances surrounding the campaign(s). For instance, an agent who is scheduled to work over the next three days of the campaign may suddenly become sick and unable to work. Thus, the user may invoke the manage schedule module and select the schedule from existing schedules. Accordingly, the manage schedule module determines the user has selected an existing schedule at Step 301 and proceeds to Step 310 so that the user may change the schedule to replace the sick agent with another agent. Once the revision has been made, the user may then re-implement the schedule so that the change is reflected within the call center systems.

In addition, the user may revise the schedule based on performance data collected for a portion of the campaign(s) that has been carried out. That is, after the campaign(s) have been conducted for a period of time, the user may revise the campaign(s), forecast, roster template, and/or schedule based on performance data collected for the campaign(s) during this period of time. Thus, returning to FIG. 3, once the user is presented with the one or more screens to manage the schedule, the user may indicate (e.g., select an option on a screen) that he would like to import performance data for the campaign(s) associated with the selected schedule. In response, the manage schedule module determines the user would like to import performance data, shown as Step 311.

In one embodiment, the user may provide a source for the performance data before selecting the option to import the data. That is, for example, the performance data may be saved in a file or database and the user identifies the location of the file or database so that, upon selecting the option to import the performance data, the data is imported. However, in another embodiment, the user may first be taken to a different screen upon selecting the option to import the performance data. Once on the screen, the user may then identify the source of the performance data and select the option to "import." Those of ordinary skill in the art can envision numerous ways in which the user can import the performance data in light of this disclosure. At this point, the manage schedule module imports the performance data, shown as Step 312.

After the performance data has been imported, the user may revise the campaign(s), forecast, roster template, and/or schedule. For example, in a typical situation, the user may rerun the forecast based on the performance data to determine whether the objectives for the campaign(s) may still be met in light of the current schedule and performance thus far. If the results of the forecast are unsatisfactory, the user may then revise the campaign(s), roster template, and/or schedule accordingly to produce a revised schedule. Thus, in various embodiments, the managing schedule module allows monitoring the performance of one or more campaigns and revising the schedule based on the monitored performance. Further detail is now provided on the individual modules with regard to various embodiments of the invention.

Campaign Module

Figure 4:
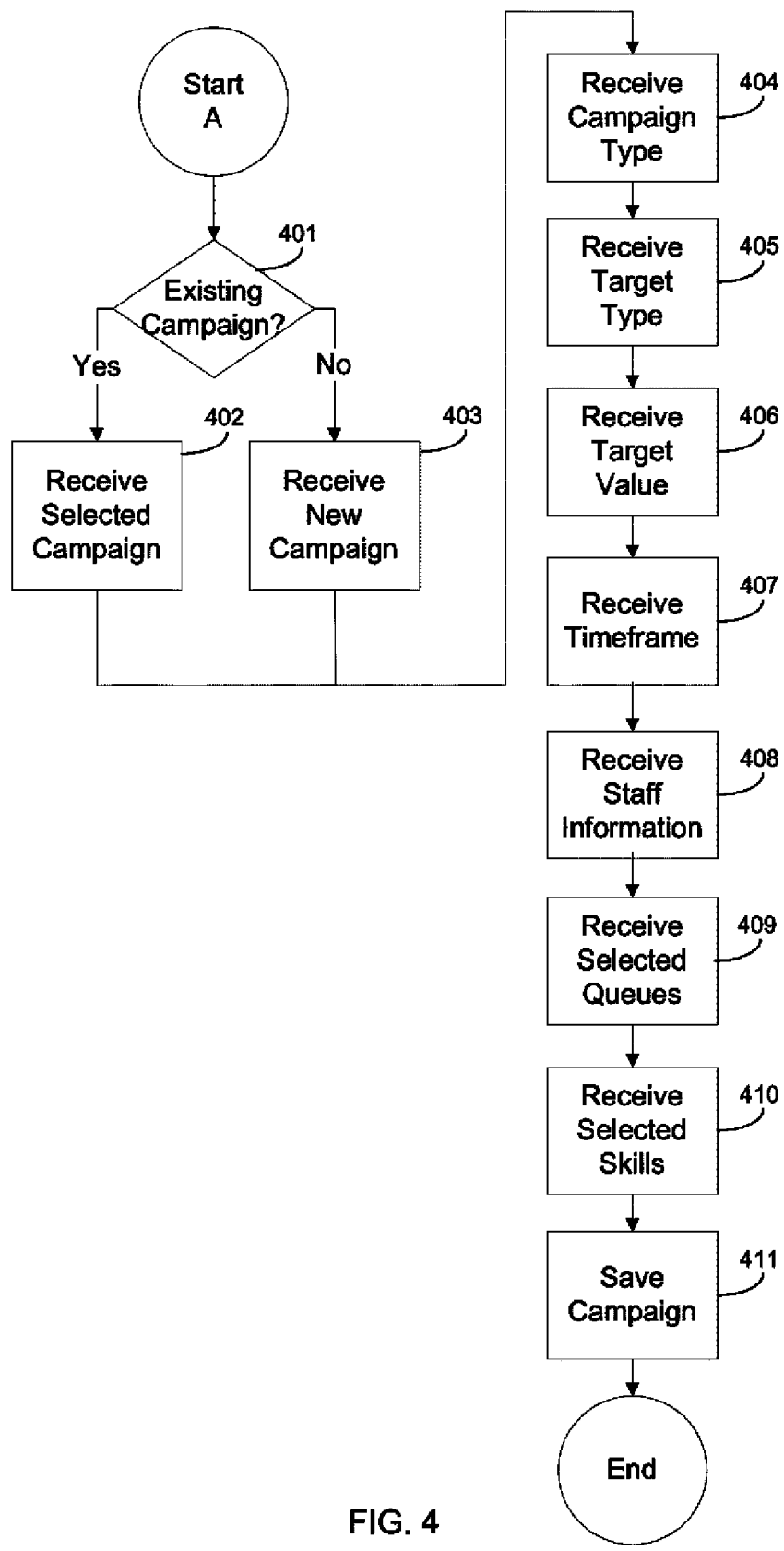
FIG. 4 is a flowchart illustrating a campaign module that can be used in accordance with various embodiments of the present invention.

Turning now to FIG. 4, additional details are provided regarding the process flow for generating and managing outbound campaigns. In particular, FIG. 4 is a flow diagram showing a campaign module for performing such functionality according to one embodiment of the invention. As mentioned, in various embodiments, the campaign module is invoked by the manage schedule module described above whenever a user generates or manages one or more outbound campaigns. However, it should be understood that in other embodiments, the campaigns module may be a stand-alone computer program module and may be used for generating campaigns without necessarily requiring generation of a forecast and/or schedule. Thus, like the manage schedule module, the flow diagram shown in FIG. 4 may correspond to steps carried out by a processor in a computing device, such as the WFM server 155 for example, as it executes the campaign module stored in the computing device's volatile and/or non-volatile memory.

In various embodiments, the campaign module enables a user to manage an individual outbound campaign by setting or modifying parameters associated with the campaign. For instance, in particular embodiments, the campaign module enables a user to indicate a particular campaign type for the campaign, set campaign objectives (e.g., goals), set a time period over which the campaign will run, set skills required by agents working the campaign, set minimum and maximum staff available to work the campaign for a particular interval of time, set outbound communication sources (e.g., outbound queues) for the campaign, or any combination thereof. Once the user has generated and defined an outbound campaign, the user is able to generate a forecast for the campaign.

Turning to FIG. 4, once the campaign module has been invoked, the user is provided an initial screen to select whether the forecast is to be based on an existing campaign or a new campaign to be defined. For example, in one embodiment, the user is provided with an initial screen that provides a listing of existing campaigns and the user simply selects the desired campaign from the listing. On the other hand, if the user wants to define a new campaign, the user is prompted to select the "New" button. A message appears on the screen requesting the user to enter a name for the new campaign and to click "Ok."

Looking at the flow diagram on FIG. 4, the campaign module determines in Step 401 whether the user wants to work with an existing campaign or define a new campaign. That is, in particular embodiments, the campaign module receives an indication whether the user has selected an existing campaign or has selected the "New" button. If the campaign module determines the user has selected an existing campaign, the module receives the selected campaign in Step 402. However, if the campaign module determines the user has selected the "New" button and has entered a name for the new campaign, the module receives the new campaign in Step 403.

At this point, in various embodiments, the user is presented with one or more screens displaying information (e.g., parameters) defined for the campaign. If the user is defining a new campaign, the fields for the information are typically blank so that the user may enter such information, although some of the fields may display default information. For example, in particular embodiments, the fields may include a description field so that the user may enter a short description of the campaign. In addition, the fields may include a field to indicate (e.g., select) the campaign type. For instance, in one embodiment, the user is given the option to set the campaign type to "entire" or "periodical." An entire campaign type applies the objectives (e.g., goals) of the campaign across the entire time period the campaign is conducted. For example, a goal may be set for a particular campaign that is to be conducted over a week that requires five thousand calls to be made across the week. At the end of the first day of the campaign, a total of seven hundred and twenty calls may have been made. Therefore, at the start of the second day, four thousand two hundred and eighty calls still need to be made during the remainder of the week. On the other hand, a periodical campaign type applies the objectives (e.g., goals) to time periods that occur during the campaign (e.g., to every day) and each time period may have its own objectives to achieve. That is, different time periods (e.g., different days) may have different objectives. For example, a particular campaign may be structured so that on weekdays between 9:00 a.m. and 12:00 p.m., the objective is to place three hundred calls and on weekdays between 5:00 p.m. and 8:00 p.m., the objective is to place six hundred calls. Once the user has selected the campaign type, the campaign module receives the selection in Step 404.

Depending on the embodiment, other fields may be included indentifying other objectives of the campaign. For instance, in one embodiment, the user may be provided with one or more fields to identify target types for the campaign. For example, the user may be provided with a field to select the target type to be applied to the campaign type. The choices of target type may include: (1) a total number of calls that need to be made during the entire campaign or particular time period in the campaign (Dials), (2) a number of calls that need to be answered by a party or an answering machine during the entire campaign or particular time period in the campaign (Connects), (3) a number of calls answered that need to be picked up by the right party (Right Party Connects, RPC), and (4) a number of RPC that need to result in a targeted activity being completed. Further, the user may be provided with a field to enter a target value for the target type. For instance, if the user has selected a target type of RPC, the user may enter a value for the number of RPC to be achieved over the entire campaign or a particular time period of the campaign. Accordingly, the campaign module receives this information in Steps 405 and 406.

Further, in particular embodiments, the user may be provided with fields to enter the timeframe over which the campaign will be conducted. If so, the campaign module receives this information in Step 407. For example, in one embodiment, fields are provided for the user to indicate the start date (e.g., day and time) and end date (e.g., day and time) for the campaign such as, for instance, Dec. 1, 2012, to Dec. 20, 2012. However, depending on the embodiment, the timeframe indicated by the user may identify a particular week(s), where other information defines when a week starts and ends. The user may indicate a number of days starting from a given date.

In addition, in particular embodiments, the user may be provided with fields to enter a minimum and maximum staff required during a particular interval of time (e.g., day) for the campaign. If so, the campaign module receives the staff information in Step 408. For example, the user may enter a value of five for the minimum staff required for each day of the campaign. As a result, the campaign will have at least five staff members working each day of the campaign. Similarly, the user may enter a value of ten for the maximum number of staff required for each day of the campaign. As a result, the campaign will have no more than ten staff members working each day of the campaign.

It is noted that in particular embodiments in which a forecast is being generated involving multiple campaigns, the user may rank the priority of the campaigns. In these particular embodiments, the effect of prioritizing the campaigns (e.g., ranking the campaigns) is that during times of projected high demand for staff, the maximum number of staff from the highest priority campaign is forecasted first, and if there are still staff available (based on the call center's capacity) then the next priority campaign's maximum staffing number is used, and so on.

In particular embodiments, the campaign module may provide one or more screens so that the user may identify the sources for outbound communications and/or the skills required by the staff who work the outbound campaign. As previously described, various call centers make use of a dialer 150 to place outbound calls to various parties. As the outbound calls are answered by a party, such calls are routed to call center staff (e.g., agents) to handle the calls. However, in particular instances when calls have been answered, the answered calls are routinely placed in one or more queues until agents become available to handle the calls. Depending on the embodiment, the queues may be set up based on any number of parameters. For instance, a queue may be set up for a particular campaign or for a particular skill set required by the agents servicing the calls placed in the queue. For example, an outbound campaign may be set up for placing outbound calls to potential customers informing them of an insurance company's new life insurance and long-term disability products. In this instance, the campaign may require agents trained on the new life insurance product and agents trained on the new long-term disability product to work during the campaign. As a result, two queues may be set up for the campaign in which one of the queues processes calls pertaining to the life insurance product and the other of the queues processes calls pertaining to the long-term disability product. Such a configuration allows the calls to be directed to the properly trained agents working the campaign.

Thus, in particular embodiments, to link a queue to the campaign, the user right-clicks in the queue area provided on the screen and a list of available queues is provided. (That is, in these particular embodiments, the queues available for the call center have been previously defined prior to the user creating the campaign.) The user selects the desired queue and clicks a button to add the queue to the list of queues associated with the campaign. If the user wants to associate another queue with the campaign, the user selects another queue, and so forth. Therefore, one or more queues may be associated with the campaign. As a result, the campaign module receives the selected queues in Step 409.

In similar fashion, in particular embodiments, to link skills to the campaign, the user right-clicks in the skills area provided on the screen and a list of available skills is provided. (Again, in these particular embodiments, the skills available for the staff of the call center have been previously defined prior to the user creating the campaign.) The user selects the desired skill and clicks a button to add the skill to the list of skills associated with the campaign. It is noted that in various embodiments, the skill may be linked, not only to the campaign, but also to one or more particular queues if desired. Once the user has selected all of the desired skills, the campaign module receives the selected skills in Step 410. As described in greater detail below, in particular embodiments, the skills associated with the campaign may also be linked to forecasts, roster templates, and schedules generated for the campaign.

At this point, the user selects a button to save the campaign. Accordingly, the campaign module saves the campaign in Step 411. It is noted that in various embodiments, the campaign module may be provided with additional capabilities. For instance, in one particular embodiment, the campaign module may provide a user with the capability to copy an existing campaign. Such a capability allows the user to build a new campaign based on an existing campaign's information (e.g., parameters). Also, particular embodiments of the campaign module may provide the capabilities to delete campaigns and to mark and manage inactive campaigns. One of ordinary skill in the art can envision other capabilities in light of this disclosure.

Forecast Module

Figure 5:
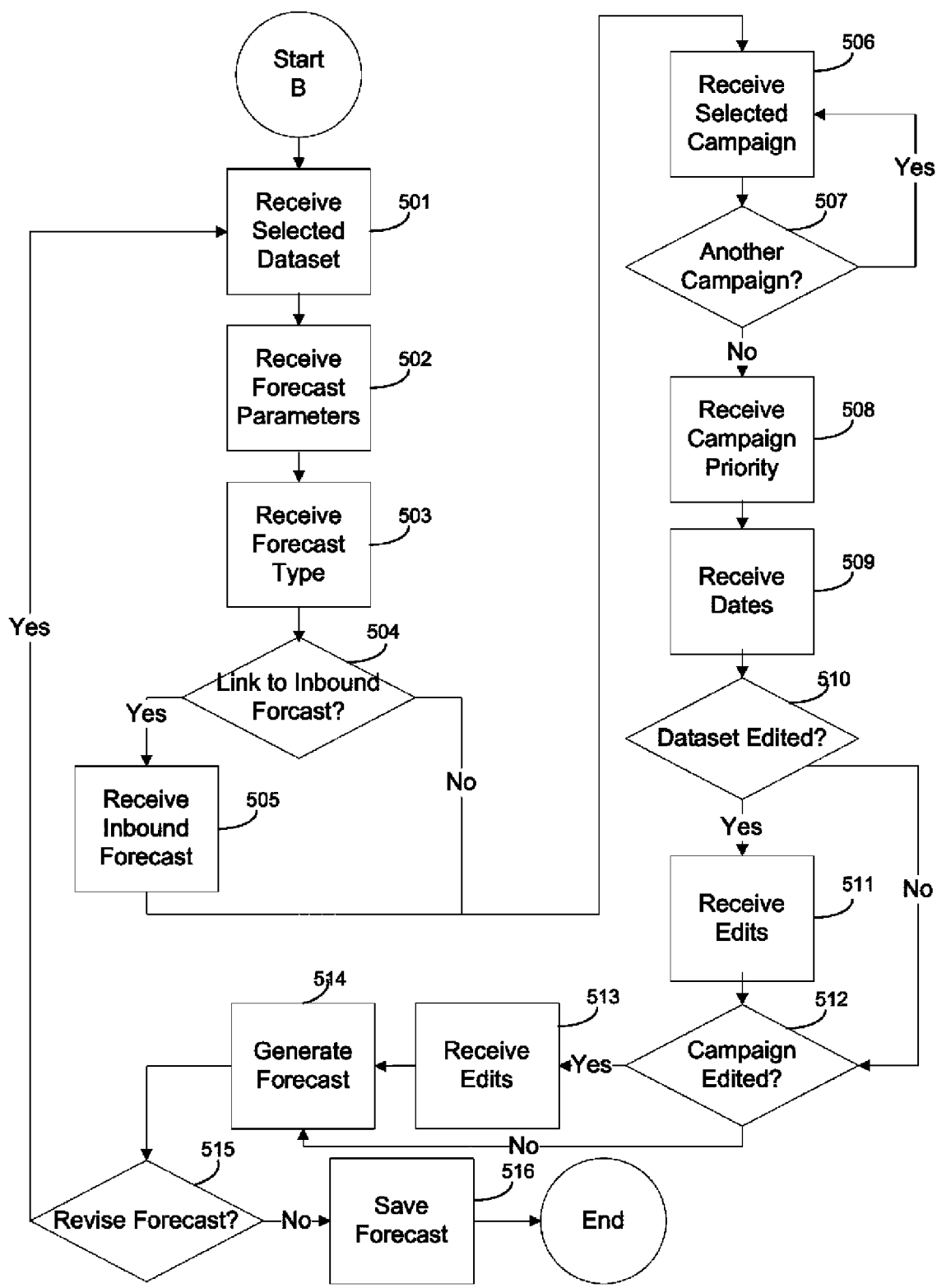
FIG. 5 is a flowchart illustrating a forecast module that can be used in accordance with various embodiments of the present invention.

Turning now to FIG. 5, additional details are provided regarding the process flow for generating and managing forecasts for outbound campaigns. In particular, FIG. 5 is a flow diagram showing a forecast module for performing such functionality according to one embodiment of the invention. Similar to the campaign module, in various embodiments, the forecast module may also be invoked by the manage schedule module described above whenever a user is to generate or manage one or more forecasts for outbound campaigns. However, it should be understood that in other embodiments, the forecast module may be a stand-alone computer program module. Thus, the flow diagram shown in FIG. 5 may correspond to steps carried out by a processor in a computing device, such as the WFM server 155 for example, as it executes the forecast module stored in the computing device's volatile and/or nonvolatile memory.

Similar to the campaign module, the forecast module is configured to enable a user to generate new forecasts and/or to modify existing forecasts according to various embodiments of the invention. For example, in one embodiment, the user may select a forecast to modify from an initial screen listing existing forecasts. Thus, the steps in FIG. 5 may be carried out for a new or existing forecast. However, for purposes of disclosure, it is assumed the user has indicated he would like to generate a new forecast.

The first step in generating an outbound forecast is for the user to select a historical dataset as the basis of the forecast. In one embodiment, the user is provided with a screen from which the user can select a dataset, such as a historical outbound dataset. In other embodiments, an inbound dataset can be selected. This screen allows the user to navigate to the location of the datasets and to select the desired dataset from a listing of existing datasets. Depending on the embodiment, the datasets may be stored in various data structures such as, for example, files or databases. Further, depending on the embodiment, the datasets may comprise different types of data for previously conducted (e.g., historical) outbound campaigns. For instance, the datasets may be grouped according to time periods and the outbound queues used to conduct outbound campaigns. However, in other instances, the datasets may be grouped according to other parameters such as based on customer or the subject matter for the outbound campaigns. For example, in one embodiment, one or more datasets may be based on outbound campaigns conducted for soliciting donations for charities while one or more other datasets may be based on outbound campaigns conducted for sales promotions for various products. Further, datasets may be combined into a "master" dataset to be used for forecasting purposes. One of ordinary skill in the art can envision numerous groupings of datasets in light of this disclosure. However, typically, a user would select a dataset (or combined datasets into a "master" dataset) with similar characteristics to the one or more outbound campaigns for which the user is generating a forecast for. Thus, the forecast module receives the selected dataset in Step 501.

Next, the user defines parameters for the forecast and the forecast module receives the parameters in Step 502. For instance, in various embodiments, the parameters may include a start date for the forecast, a location to save the forecast, an indication of how much of the historical dataset to use for the forecast, and/or whether to include "special days" from the dataset. For example, the user may select a forecast start date of Apr. 30, 2012, and a location of Location1. Depending on the embodiment, Location1 may just indicate a particular location on the call center's system to store the forecast such as, for example, the data store 175 shown in FIG. 1. However, in particular embodiments, Location1 may also indicate a particular location for the call center. For example, the call center may have office locations in Atlanta and Chicago and the location selected by the user may also identify which office location the forecast relates to. For these particular embodiments, this may help the user to keep forecasts better organized and may help the user to better search and identify desired forecasts.

The user may indicate that four weeks of data should be used from the dataset in generating the forecast and that any "special days" that fall within the four weeks should be included in the data used for generating the forecast. In particular embodiments, special days include days that are typically considered out of the "norm" for an operational day of an outbound campaign. That is, special days usually have a call pattern considered quite different than an ordinary day for the call center. For instance, public holidays or days in which the call center encountered an unusual situation such as a server crash may be marked as special days. Therefore, depending on the campaigns for which the user is generating the forecast for, the user may wish to include or exclude the special days of data that may be included in the dataset since these days could potentially affect the forecast dramatically.

In Step 503, the forecast module receives a forecast type to generate. Similar to campaign types, in various embodiments, forecast types that may be generated include an outbound "entire" forecast or an outbound "periodical" forecast. For the outbound "entire" forecast, a to-be-selected target type and value are applied across the entire forecast. That is, each day and time interval will in effect count down towards the target. For the outbound "periodical" forecast, each day and time interval will have its own target to achieve. For this type, different days and time intervals can have different targets.

Once the forecast type has been selected, the forecast module determines whether an inbound forecast is to be linked to the outbound forecast, shown as Step 504. If so, the forecast module receives the inbound forecast in Step 505. As a result of linking an inbound forecast to the outbound forecast in various embodiments, the forecast module takes into account the resources required for handling expected inbound calls when generating the outbound forecast. In some embodiments, a call center may provide priority treatment of inbound calls by allocating an agent to inbound call handling and temporarily forego originating outbound calls. For example, in particular embodiments, the forecast module takes into consideration the number of staff (e.g., agents) forecasted to be used to conduct the inbound campaign(s) associated with the inbound forecast and the capacity of staff that can be accommodated by the call center (e.g., agent seat capacity) in determining the number of staff available for conducting the outbound campaign(s) associated with the outbound forecast (e.g., the number of staff that can be allocated to the outbound forecast). Although the forecast module takes into consideration the call center's staffing capacity, in some embodiments, the call center's staffing capacity may be modified (e.g., decreased or increased) if desired. Thus, in particular embodiments, the forecast module is configured to generate an outbound forecast for one or more outbound campaigns in light of one or more inbound campaigns (and their corresponding forecast) that may be conducted during a similar time as the one or more outbound campaigns.

Next, in Step 506, the forecast module receives a selection of an outbound campaign. That is, the user selects the outbound campaign for which the user wants to include in the forecast. For example, in particular embodiments, the user is presented with a screen that includes a listing of available outbound campaigns. Depending on the embodiment, the listing may be limited based on forecast parameters. For instance, in one embodiment, the listing may only include campaigns of the same type as the forecast type selected for the forecast. That is, for example, outbound "entire" campaigns may only be listed as a result of the user selecting an outbound "entire" forecast to be conducted. The user reviews the listing and selects the desired outbound campaign.

As previously mentioned, in various embodiments, the forecast can be generated based on multiple outbound campaigns. Therefore, in Step 507, the forecast module determines whether the user has selected another outbound campaign to add to the forecast. If so, Step 506 is repeated and the forecast module receives the next selection of an outbound campaign. Once the user has selected all of the applicable outbound campaigns, the user selects a button to continue such as "Finish" or "Next" for example.

If multiple outbound campaigns have been selected, in various embodiments the user may prioritize the outbound campaigns. If so, the forecast module receives the campaign priority in Step 508. For instance, the user may determine a priority order for the outbound campaigns resulting in the higher priority campaign having priority with respect to meeting campaign goals during the forecast generation. For example, suppose the agent seating capacity at the call center is one hundred and the user has selected to generate an outbound forecast using outbound campaigns A, B, and C. The priority order for these campaigns is set at A, B, and C. An inbound forecast linked to the outbound forecast requires forty-five agents on Monday at 1 p.m. across a number of inbound queues, leaving fifty-five agents available for the outbound forecast. The parameters for the outbound campaigns have been defined as:

| Campaign | Min Staff | Max Staff |
|---|---|---|
| A | 25 | 35 |
| B | 10 | 20 |
| C | 5 | 15 |

The outbound forecast initially calculates:

| | Staff |
|---|---|
| Inbound Queues | 45 |
| Campaign A | 25 |
| Campaign B | 10 |
| Campaign C | 5 |
| Total | 85 |

Since another fifteen agents can be potentially assigned to a campaign, the following occurs for the next interval based upon the priority order of the outbound campaigns:

| | Staff |
|---|---|
| Inbound Queues | 45 |
| Campaign A | 35 |
| Campaign B | 15 |
| Campaign C | 5 |
| Total | 100 |

As one can see, for this particular example, the forecast module is configured to allocate agents to Campaign A to its maximum capacity before filling Campaign B to its maximum capacity, and so forth until all of the capacity for the call center has been used. That is, in this particular embodiment, the forecast module is configured to allocate agents to the various outbound campaigns to the maximum capacity for each outbound campaign based on the priority order of the campaigns during generating the forecast without proportioning the "spare staff" available after staffing the inbound campaign across all of the outbound campaigns.

In various embodiments, the next step in the process is the user is taken to a screen that enables the user to review and amend the selected time period (e.g., days) of historical data that are to be used as a basis of the forecast. For instance, in one embodiment, the screen displays each day of the selected time period from the historical dataset (e.g., four weeks) and the number of events (e.g., outbound calls placed) for each day. Thus, the user can review the days and events for each day to identify whether any particular days may be considered outliers that the user may want to exclude in the forecast. For example, a majority of the days may indicate that approximately four hundred and eighty events occurred for each day however one of the days may indicate that only three hundred events occurred on that day. This may be for any number of reasons such as, for example, a number of outbound trunks may have been down that day or the data for the events may not have been recorded or may have been lost. Therefore, the user may want to exclude this day from the days used for generating the forecast. Thus, in Step 509, the forecast module receives the dates (e.g., days) selected to include (or exclude depending on the embodiment) from the dataset.

Further, in particular embodiments, the user may also be able to review the specific data for each selected day to ensure the data is consistent and available for each day. For example, in one embodiment, the user may be provided with a missing values screen that provides a listing of selected days with missing values (e.g., data). For this embodiment, the user may select a day with missing values and may edit the values accordingly to address the missing values. If too many values are missing, the user may be able to clear the day from the selected dates for the dataset. Thus, in Step 510, the forecast module determines whether the dataset has been edited. If so, the forecast module receives the edits to the dataset in Step 511.

As described earlier, a number of parameters are defined when a campaign is generated and these originally defined parameters may be considered default parameters for the campaign. However, in various embodiments, the forecast module is configured to provide the user with the capability to edit the default parameters for the selected campaigns if desired. Therefore, in these particular embodiments, the user may select a particular campaign and edit the campaign's parameters such as, for example, the goals (e.g., target type and/or target value) for the campaign, the time period for which the campaign will be conducted, and the staff requirements (e.g., minimum and/or maximum agents required) for the campaign. Further, in particular embodiments, the user may indicate whether to enforce minimum staffing requirements for the campaign. If so, the forecast module allocates the minimum number of staff (e.g., agents) for all time intervals and/or queues in the forecast regardless of whether the target is met. That is, for example, a forecast may show that the target will be reached on a Thursday but staff will still be forecast for the campaign on the following Friday. Thus, in Step 512, the forecast module determines whether parameters for any of the selected campaigns have been edited. If so, the forecast module receives the edits in Step 513.

At this point, in various embodiments, the forecast module provides the user with a summary screen that shows the parameters to be used to generate the forecast (e.g., historical dataset, forecast start date, forecast type, etc.). If the user is happy with the parameters, the user selects "Finish" and the forecast module generates the forecast, shown as Step 514. In particular embodiments, the module provides a generated forecast results screen that displays a row for each campaign selected for the forecast showing the selected target type and target value for the campaign, a number of placed calls that are predicted to be achieved to attempt to meet the target, and a number of connected calls that are predicted to result from the placed calls.

In addition, in various embodiments, the forecast module makes available one or more forecast detail reports that provide specific details for various components of the forecast. For instance, in one embodiment, the forecast module provides a report on a per campaign, per queue, per time interval for the following information: (1) a total number of calls needed to be made during the campaign (if entire) or during the selected day/interval (if periodical); (2) a number of calls predicted to be answered by a person or an answering machine; (3) a number of answered calls predicted to be picked up by the right party (right party connects); (4) a number of right party connects predicted to result in a targeted activity being completed; (5) a predicted average handling time (AHT) for the calls; and/or (6) a predicted number of staff needed to achieve the targets.

In particular embodiments, the forecast module may also provide the user with the capability to smooth the outbound queues in the forecast. Smoothing a queue removes any sharp peaks or troughs in the generated forecasted staff for the particular queue which may allow for a more efficient shift pattern to be generated in order to meet the forecasted shift requirements. Smoothing of the outbound queues may also recalculate the targets (e.g., Dials, Connects, etc.).

Figure 6A:
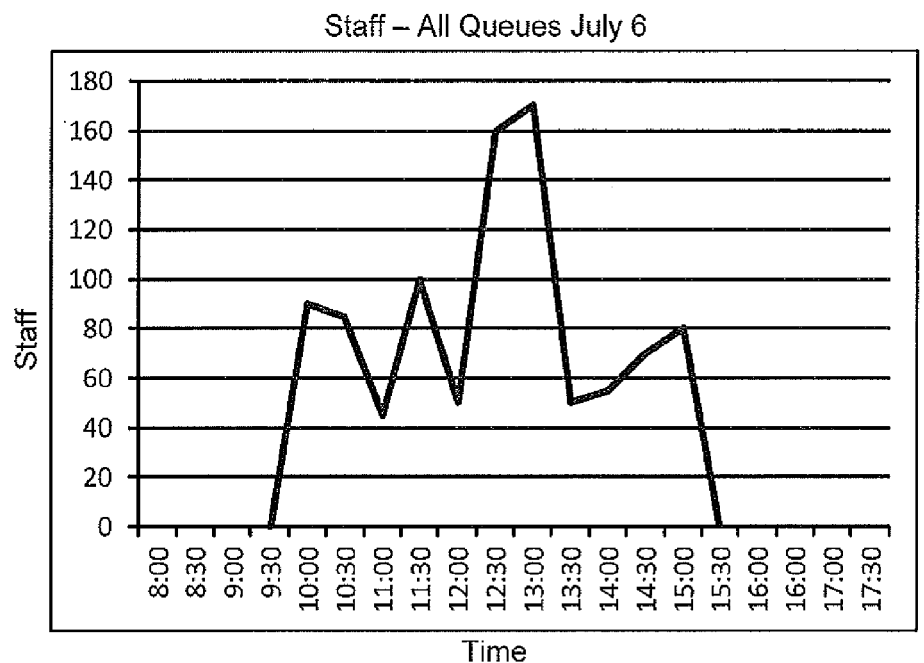
FIGS. 6A and 6B provide an example of smoothing an outbound forecast in accordance with various embodiments of the present invention.
Figure 6B:
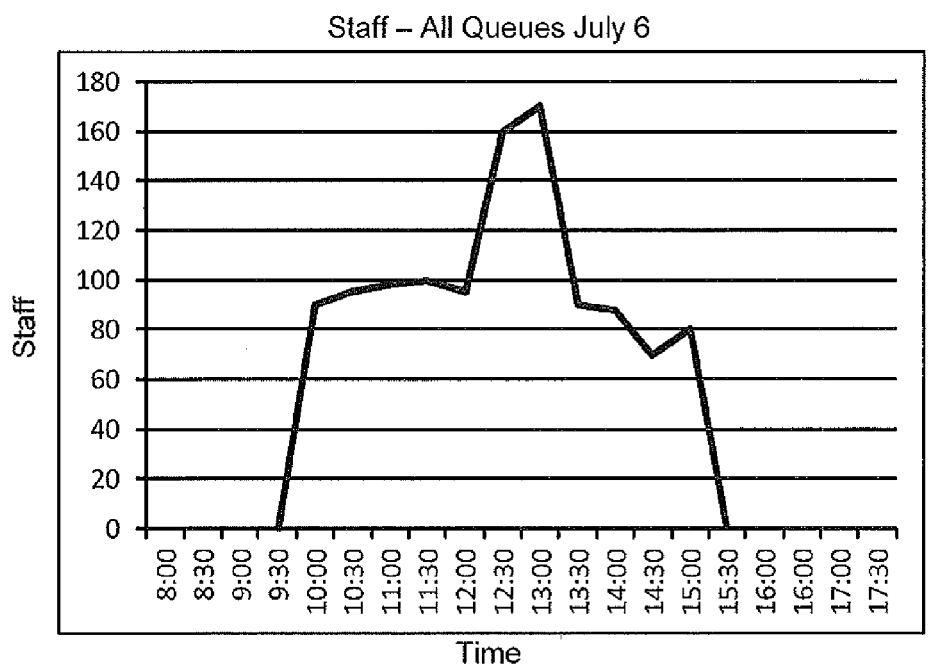

In one particular embodiment, the user selects one or more campaign queues to smooth, the dates of the forecast to include in the smoothing process, and the number of smoothing passes to make. Further, the user may indicate that a copy of the forecast is to be smoothed so that it may be compared to the original forecast. An example of smoothing the forecasted staff for all of the selected queues for a particular outbound forecast on a selected date is shown in FIGS. 6A and 6B. FIG. 6A displays the forecasted staff prior to smoothing for all of the queues associated with the forecast for July 6th. FIG. 6B displays the forecasted staff after the staff has been smoothed for all of the queues associated with the forecast. As one can see, the peaks and troughs in the original forecast for the staff have been smoothed out. As a result, a more efficient shift pattern may be generated for the forecasted shift requirements.

Returning to FIG. 5, at this point, the user may decide whether the generated forecast is acceptable or whether to revise some of the parameters for the forecast and to regenerate the forecast. Thus, in Step 515, the forecast module determines whether the user wishes to revise some of the parameters and to regenerate the forecast. If so, the forecast module returns to a point in the process where the user has an opportunity to revise one or more of the selected dataset, the forecast parameters, the forecast type, the inbound forecast, the selected campaigns for the forecast, the campaign priority, selected dates for the historical dataset, data in the dataset, and/or parameters for the selected campaigns. Once the user finds the forecast acceptable, the user selects the "Save" button and the forecast module saves the forecast, shown as Step 516. Once saved, the forecast may now be used to generate a roster template and corresponding schedule for conducting the one or more campaigns associated with the forecast. Details for these two processes are provided below.

Finally it is noted that in various embodiments, like the campaign module, the forecast module may provide additional capabilities such as the capability to copy an existing forecast, delete forecasts, and/or mark and manage inactive forecasts. One of ordinary skill in the art can envision other capabilities in light of this disclosure.

Roster Template Module

Figure 7:
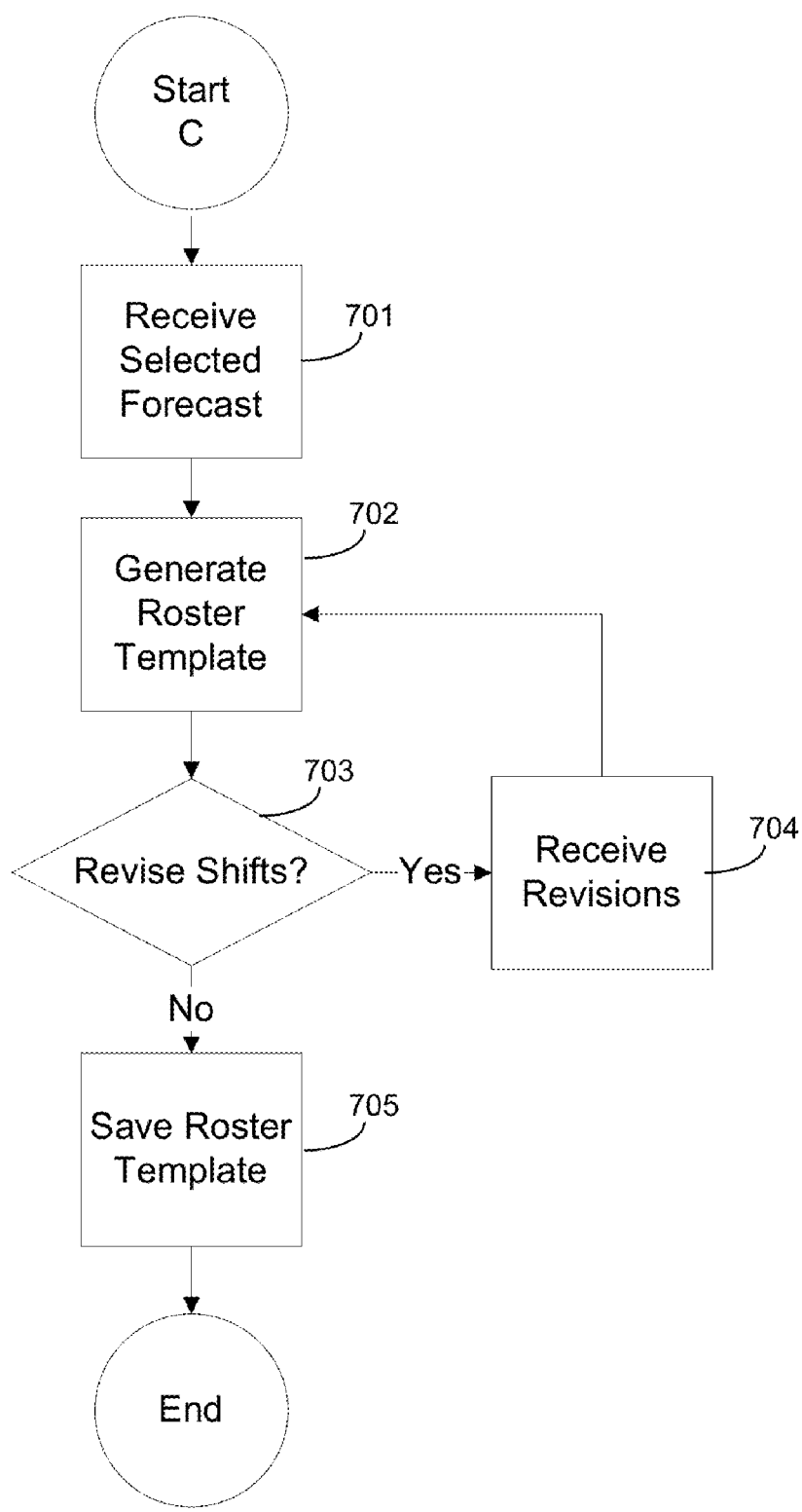
FIG. 7 is a flowchart illustrating a roster template module that can be used in accordance with various embodiments of the present invention.

Turning now to FIG. 7, additional details are provided regarding the process flow for generating and managing roster templates for outbound campaigns. In particular, FIG. 7 is a flow diagram showing a roster template module for performing such functionality according to one embodiment of the invention. Similar to the campaign and forecast modules, in various embodiments, the roster template module may also be invoked by the manage schedule module described above whenever a user is to generate or manage one or more roster templates for outbound campaigns. However, it should be understood that in other embodiments, the roster template module may be a stand-alone computer program module. Thus, the flow diagram shown in FIG. 7 may correspond to steps carried out by a processor in a computing device, such as the WFM server 155 for example, as it executes the roster template module stored in the computing device's volatile and/or nonvolatile memory.

Similar to the campaign and forecast modules, the roster template module is configured to enable a user to generate new roster templates and/or to modify existing roster templates according to various embodiments of the invention. For example, in one embodiment, the user is provided with an initial screen that provides a listing of existing roster templates from which the user may select a template to modify. Thus, the steps displayed in FIG. 7 may be carried out for a new or existing roster template. However, for purposes of disclosure, it is assumed the user had indicated he would like to generate a new roster template.

As previously described, a roster template is a group of shifts based upon a forecast that attempts to meet the goals of a campaign (e.g., to meet the requirements of the forecast). Therefore, the first step of the generation process is to select the forecast to base the roster template upon. In various embodiments, the user is provided with a screen displaying a listing of the available forecasts and may select a format. As previously described, an outbound forecast may be linked to (e.g., embedded in) an inbound forecast. Therefore, in particular embodiments, the listing of available forecasts may include both inbound forecasts and outbound forecasts. However, for purposes of explaining the functionality of the roster template module, it is assumed the user selects an existing outbound forecast to base the roster template upon. Thus, in Step 701, the roster template module receives the selected forecast.

In Step 702, the roster template module generates a roster template that satisfies the requirements of the selected forecast. That is, in various embodiments, the roster template module generates a roster template that identifies and generates the types of shifts needed to meet the requirements of the selected forecast and calculates how many instances of each shift are required based on the forecast (e.g., shift profile). In addition, in various embodiments, the generated roster template may also identify the type and number of staff required to work each individual shift (e.g., staffing profile), the skills required for each individual shift to ensure only staff with the appropriate skills work that shift (e.g., skills profile), and/or breaks or other scheduled activities (e.g., training) that are to occur during each individual shift (e.g., activity profile). Depending on the embodiment, the shift profile, staffing profile, and/or activity profile are configured based on parameters defined for the one or more outbound campaigns used in generating the forecast and/or other rules established for the call center. For example, the outbound campaigns may include parameters defining the skills required to work on the campaigns. Further, the call center may be required to provide each staff member a thirty minute break for lunch if the staff member works a shift of eight hours or more. Thus, in various embodiments, the roster template module makes uses of these defined parameters and rules in forming the staffing, skills, and/or activity profiles for each generated shift.

Once the roster template has been generated, the user can review the shifts and make any necessary revisions. For instance, in various embodiments, the roster template module may provide the user with the capability to add or revise shifts. For example, a shift may be revised to increase the staffing profile associated with a shift to include additional staff to work the shift. That is, when the roster template module generated the roster template, the module may have determined a 9:00 a.m. to 5:00 p.m. shift requiring twelve agents to work the shift. However, the user may also like to assign a supervisor to work the shift as well. Therefore, the user revises the shift to add the supervisor to the staffing profile for the 9:00 a.m. to 5:00 p.m. shift. Similar types of revisions can be made to skills profiles and the activity profiles for the various shifts as well as to shifts themselves in various embodiments. Thus, in Step 703, the roster template module determines whether any such revisions were made. If so, the roster template module receives such revisions in Step 704 and regenerates the template based on the revisions in Step 702. Once the user is satisfied with the configuration of the roster template, the user selects a button to save the template and, in response, the roster template module saves the template in Step 705. At this point, a roster template has been developed based on a forecast generated for one or more outbound campaigns. This roster template may now be applied to staff of the call center in order to generate a schedule for conducting the one or more outbound campaigns.

Finally it is noted that in various embodiments, like the campaign and forecast modules, the roster template module may provide additional capabilities to a user such as the capability to copy an existing roster template, delete templates, and/or mark and manage inactive templates. One of ordinary skill in the art can envision other capabilities in light of this disclosure.

Schedule Module

Figure 8:
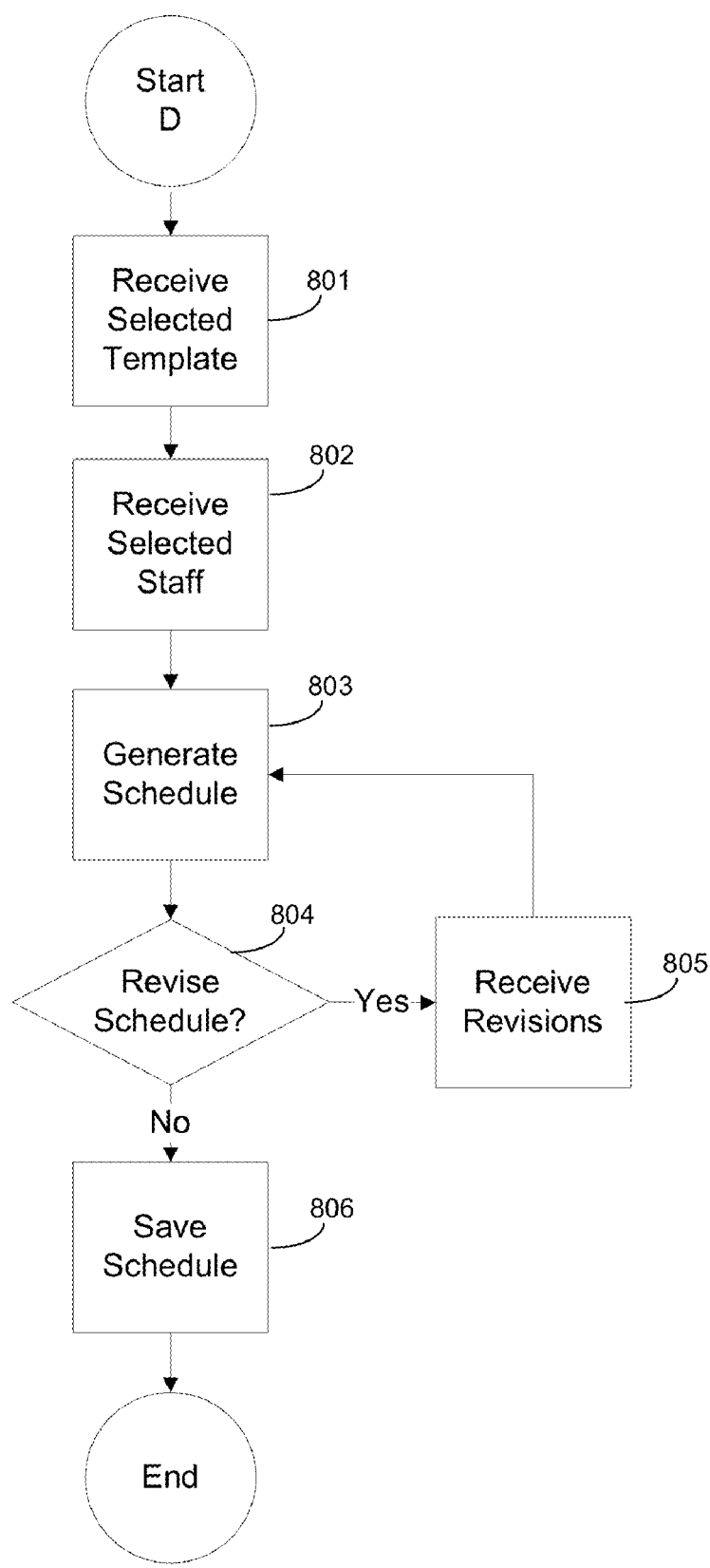
FIG. 8 is a flowchart illustrating a schedule module that can be used in accordance with various embodiments of the present invention.

Turning now to FIG. 8, additional details are provided regarding the process flow for creating and managing schedules for outbound campaigns. In particular, FIG. 8 is a flow diagram showing a schedule module for performing such functionality according to one embodiment of the invention. Similar to the campaign, forecast, and roster template modules, in various embodiments, the schedule module may also be invoked by the manage schedule module described above whenever a user generates or manages one or more schedules for outbound campaigns. However, it should be understood that in other embodiments, the schedule module may be a stand-alone computer program module. Thus, the flow diagram shown in FIG. 8 may correspond to steps carried out by a processor in a computing device, such as the WFM server 155 for example, as it executes the schedule module stored in the computing device's volatile and/or nonvolatile memory.

Similar to the campaign, forecast, and roster template modules, the schedule module is configured to enable a user to generate new schedules and/or to modify schedules according to various embodiments of the invention. For example, in one embodiment, the user is provided with an initial screen that provides a listing of existing schedules from which the user may select a schedule to modify. Thus, the steps displayed in FIG. 8 may be carried out for a new or existing schedule. However, for purposes of this disclosure, it is assumed the user has indicated he would like to generate a new schedule based on an existing roster template for one or more outbound campaigns.

Generally, the schedule module of various embodiments is configured to generate a schedule by allocating staff to an existing roster template that has been created based on a forecast. The goal is that when the schedule is generated, the schedule meets the forecast requirements of the corresponding forecast and subsequent roster template. In general, a "schedule" is understood to be a set of shift cycles with specific staff allocated to the shifts. In many instances, the schedule applies to a particular location of a call center. However, in other instances, the schedule may apply to multiple locations of the call center. For purposes of this disclosure, a "shift cycle" is understood to be a series (e.g., group) of shifts. Depending on the embodiment, a shift cycle may be generated to contain any realistic sequence of shifts and can be any length. For example, a shift cycle may include a day shift, an evening shift, and a night shift for each day of seven consecutive days (e.g., a week) totaling twenty-one shifts for the shift cycle.

In various embodiments, the schedule module uses availability information for each staff member to determine how the shifts are allocated. Depending on the embodiment, this availability information may be made available through any number of different mechanisms such as, for example, one or more databases holding information on staff members or through a manage roster program used to manage the staff members of the call center and their corresponding information.

Turning now to FIG. 8, the user reviews a listing of existing roster templates presented on a computer screen and the user selects the appropriate roster template from the listing. In turn, the schedule module receives the selected roster template in Step 801. At this point, the user identifies the staff to apply to the selected roster template. In various embodiments, the user is provided with a screen that allows the user to pick a location where to save the schedule and one or more staff to apply to the roster template. As previously described, a staff is a group of employees of the call center and is typically defined based on a number of different attributes. For instance, a staff may be a group of call center employees working at a particular location.

After selecting one or more staff, the user is provided with a "Select Staff" screen in particular embodiments. Such a screen enables the user to manually include and/or exclude members of the selected staff from being placed on the schedule. For example, in one embodiment, the screen may show a listing of all of the staff members along with a checkbox beside each staff member's name. The checkbox for each member may be initially checked indicating the staff member is eligible to be scheduled and the user goes through the list of members and un-checks the checkboxes for any members the user would like to exclude from being scheduled.

In addition, in particular embodiments, the screen may provide the user with other capabilities to identify staff members eligible to be scheduled (e.g., to apply to the roster template). For instance, in one embodiment, a checkbox may be provided that indicates to "use only primary skills." If checked, the schedule module only allocates staff members with the appropriate primary skills to shifts in the roster template that require those skills in the skills profile. In addition, in another embodiment, some of the members may have a base roster defined that indicates the members receive the same schedules over a defined period of time (e.g., weekly). That is, for example, for a particular staff member with a base roster, the particular member receives the same shifts on the same days for every schedule. In this embodiment, the screen may allow the user to indicate whether staff members' base rosters should be ignored or adhered to, or whether such members should be excluded from the staff applied to the roster template.

Thus, after the user has indicated the one or more staff to apply to the selected roster template, the schedule module receives the selection in Step 802. In turn, the schedule module generates a schedule based on the selected roster template and staff, shown as Step 803. The resulting schedule comprises the shifts identified in the roster template populated with identified members of the selected staff.

As previously mentioned, in various embodiments, the schedule module is configured to apply availability information for each of the staff members in populating the different shifts of the schedule. In addition, in various embodiments, the schedule module makes use of other information and rules associated with the campaigns, roster template, and/or call center in populating the shifts of the schedule with staff members. For example, in particular embodiments, the roster template defines skills required to be assigned to particular shifts of the schedule and the schedule module considers these skills requirements in determining which members of the staff are to work a particular shift.

At this point, the user may review the generated schedule to determine whether the schedule is acceptable or whether the schedule should be revised. For instance, in various embodiments, the user is provided with one or more screens for reviewing details of the schedule and/or the roster template and making any necessary revisions accordingly. For example, in particular embodiments, the user is provided with the capability to review and revise the various profiles (e.g., shifts, staffing, skills, and activities) of the roster template as appropriate. Depending on the embodiment, such revisions may be permanently applied to the roster template or may only be applied in the context of the current schedule.

In various embodiments, call centers may also implement rules that are to be followed by the schedule module when creating a schedule. For instance, in particular embodiments, call centers may implement rules with respect to how much and/or how often staff members are allowed to work at the call centers and/or on campaigns (e.g., hours rules). For example, the schedule module may apply one or more rules for the minimum hours that should be provided between shifts, the maximum number of consecutive shifts a staff member can work, the maximum number of shifts a staff member can work before being given time off, the maximum shift length, and/or the maximum and minimum number of minutes between breaks.

In addition, the schedule module may apply similar types of rules for taking time off (e.g., days off rules). For example, in one embodiment, schedule module may apply one or more days off rules for the number of consecutive days off a staff member is suppose to receive, what days are considered preferred days off (e.g., weekend days), and/or preferred days off patterns that specify a preferred number of days given off in a row for a specified number of times. Thus, in various embodiments, the user may be provided with the capability to revise these rules, such as hours rules and/or days off rules, to be applied in generating the schedule.

In addition, in particular embodiments, the user may also be provided with one or more screens to set a weight associated with the application of various rules used during the schedule generation process. That is, in these particular embodiments, the user may indicate which rules carry more weight to provide the schedule module with an order in which to fulfill the requirements of the rules surrounding the schedule generation process. For instance, in one embodiment, the user is provided with a screen listing the different rules to be applied during the schedule generation process and each rule is associated with a field in which the user can type in a "weighting factor" for the particular rule to identify the amount of weighting that rule should be given during the schedule generation process. For example, by increasing the weighting factor of the rule for the number of consecutive days off a staff member is suppose to receive the schedule module places a relative emphasis on adhering to this rule when generating the schedule. That is, the schedule module places more emphasis on the importance of adhering to this rule than to other rules with a lesser weighting factor.

In other embodiments, the user may also be provided with the option to set a shift fill factor on a particular screen. In these particular embodiments, a shift fill factor represents a percentage of staff that should be scheduled for a shift by the schedule module before the module moves on to schedule staff for the next shift. Setting a shift fill factor is used to evenly populate all the shifts across the entire schedule. For example, suppose the shift fill factor has been set to twenty percent and the roster template requires ten agents to be scheduled for each shift. When the schedule module generates the schedule, the module initially schedules two agents for each shift across the entire schedule (i.e., twenty percent of the staffing requirement). Thereafter, the schedule module continues to cycle through the shifts and schedule twenty percent of the staffing requirement for each shift until either the shifts are filled or no more agents are available to schedule. As a result, by setting a shift fill factor, a schedule is generated that ensures at least a minimal number of agents are working each shift on the schedule.

In addition, in particular embodiments, the user may also be given the option to set a fill strategy that identifies the method used by the schedule module to fill the shifts in the schedule. For instance, the user may be given the option to set the fill strategy to fill by utilization. For this strategy, the schedule module assesses how difficult it is to populate each shift and then fills the shifts in the schedule in an order of the most difficult shifts to fill to the easiest shifts to fill. In some embodiments, the schedule module determines how difficult a shift is to populate based upon how many staff members are required to fill the shift and divides that by the number of staff members available to work the shift. Other options to set for the fill strategy may include filling the shifts in chronological order from the beginning of the schedule or permitting the schedule module to randomly select how to fill the shifts.

In various embodiments, the user may also be provided with the option to set shift counts rules. Such rules enable the user to identify which shifts are not be over-scheduled with staff, which shifts are to be considered last in the scheduling staff allocation, and/or how many staff can be allocated to a particular shift. In these particular embodiments, the user may be provided one or more screens for setting shift counts rules. For example, in one embodiment, the rules for not over-scheduling shifts or for considering shifts last in the staff allocation are each associated with a listing of the entire shifts for the schedule. To apply a rule to a particular shift, the user selects the shift (e.g., checks the checkbox) in the appropriate listing for the rule. As for the rule setting the number of staff that can be allocated to a particular shift, this rule may also be associated with a listing of the entire shifts for the schedule in which the user may enter a value for the maximum number of staff that can be allocated to any particular shift. As a result, when the schedule module generates the schedule, the module takes into consideration the shifts that have been identified for each shift counts rule.

Further, in various embodiments, the user may also be provided with options to define additional allocation rules to be followed when the schedule module generates the schedule. For example, in particular embodiments, the user may be provided the option to set allocation for permanent staff, casual staff (e.g., temporary and/or seasonal staff), full-time staff, part-time staff, union staff, non-union staff, etc. to a percentage. For example, if allocation is set to one hundred percent for permanent staff, permanent staff who fit the selected criteria are allocated shifts until they are scheduled to work their maximum number of hours allowed. Likewise, if allocation is set to one hundred percent for casual staff, casual staff who fit the selected criteria are allocated shifts until they are scheduled to work their maximum number of hours allowed. Further, the user may be provided with an option to set an indicator for which type of employee (e.g., permanent or casual) is given preference in filling a shift vacancy.

Other examples of options that may be provided in various embodiments include an option to schedule staff based upon defined staff links. For example, in particular embodiments, call centers may make use of a manage roster program and to define properties for each staff member. These defined properties may be stored in non-volatile memory such as, for example, in one or more databases residing on a data store 175 within the call center architecture 100. Depending on the embodiment, the properties may include such information as a staff member's personal details such as home address and phone number, details about the member's work such as location where the member works, the team the member belongs to, and position the member holds, the hours the member is available to work (e.g., availability information), the skills the member holds, any shifts requests by the member, and/or other similar information.

In particular embodiments, the staff members' information includes "staff links" used to link staff members together to indicate that such members must either work together or never work together. For example, a call center may want to establish a staff link between two members to always work together so that one of the members can act as a mentor to the other member or so a new member who is taking over for an existing member can work alongside the existing member to learn the existing member's job. Further, a call center may want to establish a staff link between two members to never work together to ensure two members who have in-depth knowledge on a particular subject are never scheduled together in order to allow the knowledge to be shared across the shifts. Thus, in particular embodiments, the user may be provided with the option to indicate that such links should be adhered to by the schedule module during the schedule generation process.

Another option that is provided to the user in various embodiments is whether staff costs should be taken into consideration by the schedule module during the schedule generation process. In these particular embodiments, if the staff cost option is selected, the schedule module generates the cheapest possible schedule based upon the defined staffing costs (e.g., based upon the hourly rates defined for each of the staff members). Another option includes whether overtime is allowed. If this option is selected, the schedule module is permitted to schedule staff members for more hours than their pre-defined maximum hours to ensure adequate staffing for the schedule. Other options that may be included in various embodiments are (1) whether start times for staff members should occur within a defined range, (2) whether to ensure staff are allocated to shifts in a way that roughly evens out the hours allocated to members by a percentage, (3) whether breaks should be automatically included in the schedule based on predefined break rules, (4) whether location hours should be considered in scheduling staff members for shifts, and (5) whether a staff member only receives a shift if the member has the skill(s) required for the shift.

Returning to FIG. 8, the user may review the schedule details and revise any of the parameters described above with respect to the schedule. Thus, in Step 804, the schedule module determines whether any such parameters have been revised. If so, the schedule module receives the parameters, at Step 805, and re-generates the schedule based on the revisions, in Step 803. This process continues until the user is satisfied with the schedule. At that point, the user chooses to save the schedule and the schedule module saves the schedule in the appropriate location, shown as Step 806.

At this point, the schedule may now be used to carry out the one or more campaigns tied to the schedule. In addition, as previously described, the schedule may be revised as the campaigns are carried out based on actual performance to adjust the schedule to be better aligned with the campaigns' goals.

Finally it is noted that in various embodiments, like the campaign, forecast, and roster template modules, the schedule module may provide additional capabilities such as the capability to copy an existing schedule, delete schedules, and/or mark and manage inactive schedules. One of ordinary skill in the art can envision other capabilities in light of this disclosure.

Exemplary Processing Device Architecture

Figure 9:
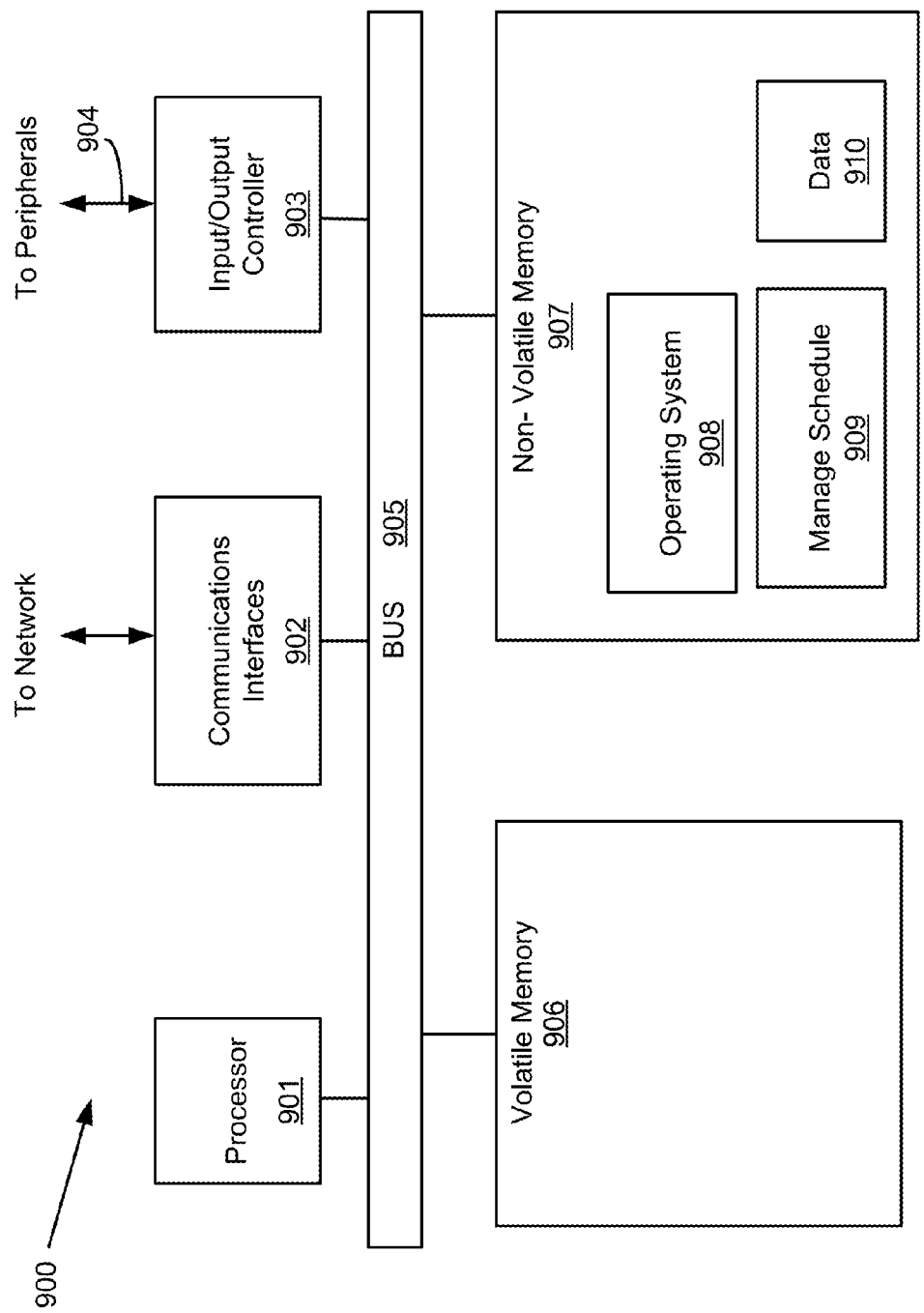
FIG. 9 is an exemplary schematic diagram of a server used in one embodiment of the call center architecture to practice the technologies disclosed herein.

As discussed in conjunction with FIG. 1, the call center architecture 100 may comprise various components that comprise a processing system. FIG. 9 is an exemplary schematic diagram of a processing system 900 that may be used in an embodiment of the call center architecture 100 to practice the technologies disclosed herein such as, for example, the ACD 130, IVR 135, CRM server 140, CTI server 145, dialer 150, WFM server 155, or other component previously described. In general, the term "processing system" may be exemplified by, for example, but without limitation: a personal computer, server, desktop computer, tablets, smart phones, notebooks, laptops, distributed systems, servers, blades, gateways, switches, and the like, as well as any combination of devices or entities adapted to perform the functions described herein.

As shown in FIG. 9, the processing system 900 may include one or more processors 901 that may communicate with other elements within the processing system 900 via a bus 905. The processor 901 may be implemented as one or more complex programmable logic devices ("CPLD"), microprocessors, multi-core processors, digital signal processors ("DSP"), system-on-a-chip ("SOC"), co-processing entities, application-specific integrated circuits ("ASIC"), field programmable gate arrays ("FPGA"), programmable logic arrays ("PLA"), hardware accelerators, other circuitry, or the like.

In one embodiment, the processing system 900 may also include one or more communications interfaces 902 for communicating data via the local network with various external devices, such as other components of FIG. 1. In other embodiments, communication may be via wired, optical, or wireless networks (or a combination thereof). The communication may use a variety of data transmission protocols, such as fiber distributed data interface (FDDI), Ethernet, asynchronous transfer mode ("ATM"), or frame relay.

The input/output controller 903 may also communicate with one or more input devices or peripherals using an interface 904, such as, but not limited to: a keyboard, a mouse, a touch screen/display input, microphone, pointing device, etc. The input/output controller 903 may also communicate with output devices or peripherals, such as displays, printers, speakers, headsets, banner displays, etc.

The processor 901 may be configured to execute instructions stored in volatile memory 906, non-volatile memory 907, or other forms of computer-readable storage media accessible to the processor 901. The volatile memory 906 may comprise various types of memory technologies, including, but not limited to: random access memory ("RAM"), dynamic random access memory ("DRAM"), static random access memory ("SRAM"), and other forms well known to those skilled in the art. The non-volatile memory 907 may comprise various technologies, including, but not limited to: storage media such as hard disks, floppy disks, read only memory ("ROM"), programmable read only memory ("PROM"), electrically erasable read only memory ("EPROM"), flash memory, and other forms well known to those skilled in the art.

The non-volatile memory 907 may store program code and data, which also may be loaded into the volatile memory 906 at execution time. Specifically, the non-volatile memory 907 may store one or more computer program modules, such as a manage schedule module 909, and/or operating system code 908 containing instructions for performing the process and/or functions associated with the technologies disclosed herein. In addition, the manage schedule module 909 may comprise further modules detailed previously. The manage schedule program module 909 may also access, generate, or store data 910, such as the aforementioned records and data, in the non-volatile memory 907, as well as in the volatile memory 906. The volatile memory 906 and/or non-volatile memory 907 may be used to store other information including, but not limited to: records, applications, programs, scripts, source code, object code, byte code, compiled code, interpreted code, machine code, executable instructions, or the like. These may be executed or processed by, for example, the processor 901. These may form a part of, or may interact with, the manage schedule module 909.

The technologies described herein may be implemented in various ways, including as computer program products comprising memory storing instructions causing a processor to perform the operations associated with the above technologies. The computer program product may comprise a tangible non-transitory computer readable storage medium storing applications, programs, program modules, scripts, source code, program code, object code, byte code, compiled code, interpreted code, machine code, executable instructions, and/or the like (also referred to herein as executable instructions, instructions for execution, program code, and/or similar terms). Such non-transitory computer readable storage media include all the above identified media (including volatile and non-volatile media), but does not include a transitory, propagating signal. Non-volatile computer readable storage medium may specifically comprise: a floppy disk, flexible disk, hard disk, magnetic tape, compact disc read only memory ("CD-ROM"), compact disc compact disc-rewritable ("CD-RW"), digital versatile disc ("DVD"), Blu-Ray™ disc ("BD"), any other non-transitory optical medium, and/or the like. Non-volatile computer-readable storage medium may also comprise read-only memory ("ROM"), programmable read-only memory ("PROM"), erasable programmable read-only memory ("EPROM"), electrically erasable programmable read-only memory ("EEPROM"), flash memory, and/or other technologies known to those skilled in the art.

CONCLUSION

Many modifications and other embodiments of the concepts and technologies set forth herein will come to mind to one skilled in the art having the benefit of the teachings presented in the foregoing descriptions and the associated drawings. Therefore, it is to be understood that embodiments other than the embodiments disclosed herein are intended to be included within the scope of the appended claims. Although specific terms may be employed herein, they are used in a generic and descriptive sense only and not for purposes of limitation.

The invention claimed is:

1. A method for identifying an optimal outbound forecast for a call center having a defined agent resource capacity, the method comprising the steps of:

defining campaign parameters for a first outbound call campaign and a second outbound call campaign to be conducted using the defined agent resource capacity for the call center, the campaign parameters for each of the first outbound call campaign and the second outbound call campaign comprising: (1) a corresponding time period over which the outbound call campaign is to be carried out and (2) a corresponding target value identifying a number of an outbound communication result to occur over the corresponding time period, wherein at least a portion of the corresponding time period for each of the first outbound call campaign and the second outbound call campaign overlap one another and a first allocation of agent resources for the first outbound call campaign impacts a second allocation of agent resources for the second outbound call campaign;

selecting a historical dataset comprising historical data on the corresponding outbound communication result for each of the first outbound call campaign and the second outbound call campaign based on past outbound communications handled over a historical time period;

generating an outbound forecast by at least one computer processor, the outbound forecast based on the historical dataset, the campaign parameters for each of the first outbound call campaign and the second outbound call campaign, and the defined agent resource capacity for the call center, wherein the outbound forecast comprises:

(1) a corresponding number of the outbound communication result forecasted to be achieved over the corresponding time period for each of the first outbound call campaign and the second outbound call campaign in an attempt to meet the corresponding target value for the corresponding outbound call campaign, and (2) a corresponding number of agent resources allocated to each of the first outbound call campaign and the second outbound call campaign to achieve the corresponding number of the outbound communication result forecasted for the corresponding outbound call campaign;

editing the campaign parameters for at least one of the first outbound call campaign and the second outbound call campaign by revising at least one of: (1) the corresponding time period over which the outbound call campaign is to be carried out and (2) the corresponding target value identifying the number of the outbound communication result to occur over the corresponding time period;

generating a revised outbound forecast by the at least one computer processor based on the historical dataset, the edited campaign parameters, and the defined agent resource capacity for the call center, wherein the revised outbound forecast comprises:
(1) a revised corresponding number of the outbound communication result forecasted to be achieved over the corresponding time period for each of the first outbound call campaign and the second outbound call campaign in the attempt to meet the corresponding target value for the corresponding outbound call campaign, and
(2) a revised corresponding number of agent resources allocated to each of the first outbound call campaign and the second outbound call campaign to achieve the revised corresponding number of the outbound communication result forecasted for the corresponding outbound call campaign; and identifying the optimal outbound forecast as the outbound forecast or the revised outbound forecast based on the corresponding number of the outbound communication result forecasted to be achieved for each of the first outbound call campaign and the second outbound call campaign in the outbound forecast and the revised corresponding number of the outbound communication result forecasted to be achieved for each of the first outbound call campaign and the second outbound call campaign in the revised outbound forecast.

2. The method of claim 1 further comprising the step of setting a priority order for the attempts to meet the corresponding target value for each of the first outbound call campaign and the second outbound call campaign over the corresponding time period, and wherein the generating of at least one of the outbound forecast and the revised outbound forecast involves considering the priority order.

3. The method of claim 1, wherein the outbound communication result for each of the first outbound call campaign and the second outbound call campaign comprises one of: (1) a total number of communications that need to be made during the corresponding time period or a portion of the corresponding time period for the corresponding outbound call campaign; (2) a number of communications that need to be answered during the corresponding time period or the portion of the corresponding time period for the corresponding outbound call campaign; (3) a number of communications answered that need to be answered by a right party; and (4) a number of communications answered by the right party that need to result in a targeted activity being completed.

4. The method of claim 1 further comprising the step of defining forecast parameters, the forecast parameters comprising an indicator of an amount of the historical dataset to use for at least one of the outbound forecast and the revised outbound forecast, wherein the generating of at least one of the outbound forecast and the revised outbound forecast is also based on the forecast parameters.

5. The method of claim 1 further comprising the steps of:
generating a roster template, the roster template comprising:
shifts needed to meet the corresponding number of agent resources allocated to each of the first outbound call campaign and the second outbound call campaign to achieve the corresponding number of the outbound communication result forecasted to be achieved for each of the first outbound call campaign and the second outbound call campaign in the outbound forecast if the optimal outbound forecast is identified as the outbound forecast, or
shifts needed to meet the revised corresponding number of agent resources allocated to each of the first outbound call campaign and the second outbound call campaign to achieve the revised corresponding number of the outbound communication result forecasted to be achieved for each of the first outbound call campaign and the second outbound call campaign in the revised outbound forecast if the optimal outbound forecast is identified as the revised outbound forecast; and applying a staff of agents to the shifts of the roster template by the at least one computer processor to produce a schedule, wherein the schedule defines which agents of the staff of agents are to work which of the shifts during at least a portion of the corresponding time period over which each of the first outbound call campaign and the second outbound call campaign is to be carried out.

6. The method of claim 5, wherein the roster template further comprises rules defining types of shifts required during each of the first outbound call campaign and the second outbound call campaign, a corresponding number of each shift type required during each of the first outbound call campaign and the second outbound call campaign, types of agents required during each shift type, a number of each agent type required during each shift type, and skills required by each agent type.

7. The method of claim 1, wherein the steps of generating the outbound forecast and the revised outbound forecast are also based on an inbound forecast, and the defined agent resource capacity available for each of the first outbound call campaign and the second outbound call campaign during the corresponding time period comprises a total number of agent resources available for handling outbound communications and inbound communications minus a number of agent resources allocated to the inbound forecast.

8. A tangible computer-readable storage medium comprising instructions for identifying an optimal outbound forecast for a call center having a defined agent resource capacity that when read by a computer processor, cause the computer processor to:
receive campaign parameters defined for a first outbound call campaign and a second outbound call campaign to be conducted using the defined agent resource capacity for the call center, the campaign parameters for each of the first outbound call campaign and the second outbound call campaign comprising: (1) a corresponding time period over which the outbound call campaign is to be carried out and (2) a corresponding target value identifying a number of an outbound communication result to occur over the corresponding time period, wherein at least a portion of the corresponding time period for each of the first outbound call campaign and the second outbound call campaign overlap one another and a first allocation of agent resources for the first outbound call campaign impacts a second allocation of agent resources for the second outbound call campaign;
receive a selection of a historical dataset, the historical dataset comprising historical data on the corresponding outbound communication result for each of the first outbound call campaign and the second outbound call campaign based on past outbound communications handled over a historical time period;
generate an outbound forecast based on the historical dataset, the campaign parameters for each of the first outbound call campaign and the second outbound call campaign, and the defined agent resource capacity for the call center, wherein the outbound forecast comprises:
- (1) a corresponding number of the outbound communication result forecasted to be achieved over the corresponding time period for each of the first outbound call campaign and the second outbound call campaign in an attempt to meet the corresponding target value for the corresponding outbound call campaign, and
- (2) a corresponding number of agent resources allocated to each of the first outbound call campaign and the second outbound call campaign to achieve the corresponding number of the outbound communication result forecasted for the corresponding outbound call campaign;

receive edited campaign parameters for at least one of the first outbound call campaign and the second outbound call campaign, the edited campaign parameters comprising a revision of at least one of: (1) the corresponding time period over which the outbound call campaign is to be carried out and (2) the corresponding target value identifying the number of the outbound communication result to occur over the corresponding time period;

generate a revised outbound forecast based on the historical dataset, the edited campaign parameters, and the defined agent resource capacity for the call center, wherein the revised outbound forecast comprises:
- (1) a revised corresponding number of the outbound communication result forecasted to be achieved over the corresponding time period for each of the first outbound call campaign and the second outbound call campaign in the attempt to meet the corresponding target value for the corresponding outbound call campaign, and
- (2) a revised corresponding number of agent resources allocated to each of the first outbound call campaign and the second outbound call campaign to achieve the revised corresponding number of the outbound communication result forecasted for the corresponding outbound call campaign; and identify the optimal outbound forecast as the outbound forecast or the revised outbound forecast based on the corresponding number of the outbound communication result achieved for each of the first outbound call campaign and the second outbound call campaign in the outbound forecast and the revised corresponding number of the outbound communication result forecasted to be achieved for each of the first outbound call campaign and the second outbound call campaign in the revised outbound forecast.

9. The computer-readable storage medium of claim 8 further comprising instructions that when read by the computer processor, cause the computer processor to receive a priority order for the attempts to meet the corresponding target value for each of the first outbound call campaign and the second outbound call campaign over the corresponding time period, wherein at least one of the outbound forecast and the revised outbound forecast is generated based on the priority order.

10. The computer-readable storage medium of claim 8, wherein the outbound communication result for each of the first outbound call campaign and the second outbound call campaign comprises one of: (1) a total number of communications that need to be made during the corresponding time period or a portion of the corresponding time period for the corresponding outbound call campaign; (2) a number of communications that need to be answered during the corresponding time period or the portion of the corresponding time period for the corresponding outbound call campaign; (3) a number of communications answered that need to be answered by a right party; and (4) a number of communications answered by the right party that need to result in a targeted activity being completed.

11. The computer-readable storage medium of claim 8 further comprising instructions that when read by the computer processor, cause the computer processor to receive forecast parameters comprising an indicator of an amount of the historical dataset to use for at least one of the outbound forecast and the revised outbound forecast, wherein the generating of at least one of the outbound forecast and the revised outbound forecast is also based on the forecast parameters.

12. The computer-readable storage medium of claim 8 further comprising instructions that when read by the computer processor, cause the computer processor to:
- generate a roster template, the roster template comprising:
  - shifts needed to meet the corresponding number of agent resources allocated to each of the first outbound call campaign and the second outbound call campaign to achieve the corresponding number of the outbound communication result forecasted to be achieved for each of the first outbound call campaign and the second outbound call campaign in the outbound forecast if the optimal outbound forecast is identified as the outbound forecast, or
  - shifts needed to meet the revised corresponding number of agent resources allocated to each of the first outbound call campaign and the second outbound call campaign to achieve the revised corresponding number of the outbound communication result forecasted to be achieved for each of the first outbound call campaign and the second outbound call campaign in the revised outbound forecast if the optimal outbound forecast is identified as the revised outbound forecast; and
- apply a staff of agents to the shifts of the roster template to produce a schedule, wherein the schedule defines which agents of the staff of agents are to work which of the shifts during at least a portion of the corresponding time period over which each of the first outbound call campaign and the second outbound call campaign is to be carried out.

13. The computer-readable storage medium of claim 12, wherein the roster template further comprises rules defining types of shifts required during each of the first outbound call campaign and the second outbound call campaign, a corresponding number of each shift type required during each of the first outbound call campaign and the second outbound call campaign, types of agents required during each shift type, a number of each agent type required during each shift type, and skills required by each agent type.

14. The computer-readable storage medium of claim 8, wherein generating the outbound forecast and generating the revised outbound forecast are also based on an inbound forecast, and the defined agent resource capacity available for each of the first outbound call campaign and the second outbound call campaign during the corresponding time period comprises a total number of agent resources available for handling outbound communications and inbound communications minus a number of agent resources allocated to the inbound forecast.

15. A system for identifying an optimal outbound forecast for a call center having a defined agent resource capacity comprising:

at least one computer processor configured to:
receive campaign parameters defined for a first outbound call campaign and a second outbound call campaign to be conducted using the defined agent resource capacity for the call center, the campaign parameters for each of the first outbound call campaign and the second outbound call campaign comprising: (1) a corresponding time period over which the outbound call campaign is to be carried out and (2) a corresponding target value identifying a number of an outbound communication result to occur over the corresponding time period, wherein at least a portion of the corresponding time period for each of the first outbound call campaign and the second outbound call campaign overlap one another and a first allocation of agent resources for the first outbound call campaign impacts a second allocation of agent resources for the second outbound call campaign;
receive a selection of a historical dataset, the historical dataset comprising historical data on the corresponding outbound communication result for each of the first outbound call campaign and the second outbound call campaign based on past outbound communications placed over a historical time period;
generate an outbound forecast based on the historical dataset, the campaign parameters for each of the first outbound call campaign and the second outbound call campaign, and the defined agent resource capacity for the call center, wherein the outbound forecast comprises:
  (1) a corresponding number of the outbound communication result forecasted to be achieved over the corresponding time period for each of the first outbound call campaign and the second outbound call campaign in an attempt to meet the corresponding target value for the corresponding outbound call campaign, and
  (2) a corresponding number of agent resources allocated to each of the first outbound call campaign and the second outbound call campaign to achieve the corresponding number of the outbound communication result forecasted for the corresponding outbound call campaign;
receive edited campaign parameters for at least one of the first outbound call campaign and the second outbound call campaign, the edited campaign parameters comprising a revision of at least one of: (1) the corresponding time period over which the outbound call campaign is to be carried out and (2) the corresponding target value identifying the number of the outbound communication result to occur over the corresponding time period;
generate a revised outbound forecast based on the historical dataset, the edited campaign parameters, and the defined agent resource capacity for the call center, wherein the revised outbound forecast comprises:
  (1) a revised corresponding number of the outbound communication result forecasted to be achieved over the corresponding time period for each of the first outbound call campaign and the second outbound call campaign in the attempt to meet the corresponding target value for the corresponding outbound call campaign, and
  (2) a revised corresponding number of agent resources allocated to each of the first outbound call campaign and the second outbound call campaign to achieve the revised corresponding number of the outbound communication result forecasted for the corresponding outbound call campaign; and
identify the optimal outbound forecast as the outbound forecast or the revised outbound forecast based on the corresponding number of the outbound communication result forecasted to be achieved for each of the first outbound call campaign and the second outbound call campaign in the outbound forecast and the revised corresponding number of the outbound communication result forecasted to be achieved for each of the first outbound call campaign and the second outbound call campaign in the revised outbound forecast.

16. The system of claim 15, wherein the at least one computer processor is further configured to receive a priority order for the attempts to meet the corresponding target value for each of the first outbound call campaign and the second outbound call campaign over the corresponding time period, wherein at least one of the outbound forecast and the revised outbound forecast is generated based on the priority order.

17. The system of claim 15, wherein the outbound communication result for each of the first outbound call campaign and the second outbound call campaign comprises one of: (1) a total number of communications that need to be made during the corresponding time period or a portion of the corresponding time period for the corresponding outbound call campaign; (2) a number of communications that need to be answered during the corresponding time period or the portion of the corresponding time period for the corresponding outbound call campaign; (3) a number of communications answered that need to be answered by a right party; and (4) a number of communications answered by the right party that need to result in a targeted activity being completed.

18. The system of claim 15, wherein the at least one computer processor is further configured to receive forecast parameters comprising an indicator of an amount of the historical dataset to use for at least one of the outbound forecast and the revised outbound forecast, and the generation of at least one of the outbound forecast and the revised outbound forecast is also based on the forecast parameters.

19. The system of claim 15, wherein the at least one computer processor is further configured to:
generate a roster template, the roster template comprising:
  shifts needed to meet the corresponding number of agent resources allocated to each of the first outbound call campaign and the second outbound call campaign to achieve the corresponding number of the outbound communication result forecasted to be achieved for each of the first outbound call campaign and the second outbound call campaign in the outbound forecast if the optimal outbound forecast is identified as the outbound forecast, or
  shifts needed to meet the revised corresponding number of agent resources allocated to each of the first outbound call campaign and the second outbound call campaign to achieve the revised corresponding number of the outbound communication result forecasted to be achieved for each of the first outbound call campaign and the second outbound call campaign in the revised outbound forecast if the optimal outbound forecast is identified as the revised outbound forecast; and
apply a staff of agents to the shifts of the roster template to produce a schedule, wherein the schedule defines which agents of the staff of agents are to work which of the shifts during at least a portion of the corresponding time period over which each of the first outbound call campaign and the second outbound call campaign is to be carried.

20. The system of claim 19, wherein the roster template further comprises rules defining types of shifts required during each of the first outbound call campaign and the second outbound call campaign, a corresponding number of each shift type required during each of the first outbound call campaign and the second outbound call campaign, types of agents required during each shift type, a number of each agent type required during each shift type, and skills required by each agent type.

21. The system of claim 15, wherein generating the outbound forecast and generating the revised outbound forecast are also based on an inbound forecast, and the defined agent resource capacity available for each of the first outbound call campaign and the second outbound call campaign during the corresponding time period comprises a total number of agent resources available for handling outbound communications and inbound communications minus a number of agent resources allocated to the inbound forecast.

* * * * *